United States Patent
Fukata et al.

(10) Patent No.: US 9,589,193 B2
(45) Date of Patent: Mar. 7, 2017

(54) THREE-DIMENSIONAL OBJECT DETECTION DEVICE AND THREE-DIMENSIONAL OBJECT DETECTION METHOD

(71) Applicant: Nissan Motor Co., Ltd., Yokohama-shi, Kanagawa (JP)

(72) Inventors: Osamu Fukata, Commerce Township, MI (US); Yasuhisa Hayakawa, Yokohama (JP)

(73) Assignee: Nissan Motor Co., Ltd, Yokohama (JP)

( * ) Notice: Subject to any disclaimer, the term of this patent is extended or adjusted under 35 U.S.C. 154(b) by 0 days.

(21) Appl. No.: 14/409,516

(22) PCT Filed: Jul. 25, 2013

(86) PCT No.: PCT/JP2013/070223
§ 371 (c)(1),
(2) Date: Dec. 19, 2014

(87) PCT Pub. No.: WO2014/017601
PCT Pub. Date: Jan. 30, 2014

(65) Prior Publication Data
US 2015/0324651 A1 Nov. 12, 2015

(30) Foreign Application Priority Data

Jul. 27, 2012 (JP) ................................. 2012-166519

(51) Int. Cl.
*H04N 7/18* (2006.01)
*G05D 1/00* (2006.01)
(Continued)

(52) U.S. Cl.
CPC ............ *G06K 9/00805* (2013.01); *B60R 1/00* (2013.01); *G06K 9/00201* (2013.01);
(Continued)

(58) Field of Classification Search
CPC .......... H04N 13/00–13/04; H04N 7/18; G06F 17/10; G06T 1/00; G05D 1/00; G08G 1/16
See application file for complete search history.

(56) References Cited

U.S. PATENT DOCUMENTS

2005/0094215 A1* 5/2005 Nagasaka .......... H04N 1/00002
358/406
2006/0184297 A1* 8/2006 Higgins-Luthman ..... B60R 1/00
701/41

FOREIGN PATENT DOCUMENTS

CN 1862620 A 11/2006
CN 102055956 A 5/2011
(Continued)

*Primary Examiner* — Behrooz Senfi
*Assistant Examiner* — Maryam Nasri
(74) *Attorney, Agent, or Firm* — Global IP Counselors, LLP

(57) ABSTRACT

A three-dimensional object detection device has an image capturing unit, a first object detection unit, a light source detection unit, a second object detection unit, a degree-of-clouding calculation unit and a controller. The image capturing unit captures images rearward of a vehicle. The first object detection unit detects a presence of a three-dimensional object from the captured images. The second object detection unit detects a presence of a three-dimensional object from a detection result of the light source detection unit. The degree-of-clouding calculation unit calculates a degree of lens clouding from the captured images. The controller assess the object as an adjacent vehicle in an adjacent lane from the degree of lens clouding when the degree of lens clouding is equal to or greater than a predetermined value and from the presence of the object in the captured images when the degree of lens clouding is less than the value.

16 Claims, 24 Drawing Sheets

(51) Int. Cl.
*G06T 1/00* (2006.01)
*G08G 1/16* (2006.01)
*G06F 17/10* (2006.01)
*G06K 9/00* (2006.01)
*G06T 7/00* (2006.01)
*B60R 1/00* (2006.01)

(52) U.S. Cl.
CPC .......... *G06K 9/00825* (2013.01); *G06T 7/004* (2013.01); *H04N 7/18* (2013.01); *H04N 7/181* (2013.01); *B60R 2300/802* (2013.01); *G06K 2209/23* (2013.01); *G06T 2207/30261* (2013.01); *G08G 1/166* (2013.01); *G08G 1/167* (2013.01)

(56) References Cited

FOREIGN PATENT DOCUMENTS

| | | | | |
|---|---|---|---|---|
| DE | 10322087 | A1 | 12/2004 | |
| EP | 1837803 | A2 | 9/2007 | |
| EP | 2400315 | A1 | 12/2011 | |
| EP | 2682899 | A2 | 1/2014 | |
| JP | 2001-23093 | A | 1/2001 | |
| JP | 2008-52320 | A | 3/2008 | |
| JP | 2008-64630 | A | 3/2008 | |
| JP | 2008-219063 | A | 9/2008 | |
| JP | 2008-227646 | A | 9/2008 | |
| JP | 2012-3662 | A | 1/2012 | |
| JP | 2006-003662 | * | 5/2012 | ............... G06T 1/00 |

* cited by examiner

THREE-DIMENSIONAL OBJECT DETECTION DEVICE AND THREE-DIMENSIONAL OBJECT DETECTION METHOD

CROSS-REFERENCE TO RELATED APPLICATIONS

This application is a U.S. National stage application of International Application No. PCT/JP2013/070223, filed Jul. 25, 2013, which claims priority to Japanese Patent Application No. 2012-166519 filed in Japan on Jul. 27, 2012. The entire disclosure of Japanese Patent Application No. 2012-166519 is hereby incorporated herein by reference.

BACKGROUND

Field of the Invention

The present invention relates to a three-dimensional object detection device and a three-dimensional object detection method.

Background Information

In a conventionally known technique, two captured images captured at different times are converted to a bird's-eye view image, and a three-dimensional object is detected based on a difference in the two converted bird's-eye view images (see Japanese Laid-Open Patent Application No. 2008-227646).

SUMMARY

In a case in which a three-dimensional object present in an adjacent lane adjacent to the lane of travel of a host vehicle is detected as an adjacent vehicle based on the captured image captured by a camera, when water scale or other foreign matter adheres to a lens of the camera and the lens is clouded, a portion of the luminous flux from the subject is obscured by the water scale or other foreign matter adhering to the lens and is diffusely reflected, and an image of the adjacent vehicle cannot be appropriately captured. As a result, the adjacent vehicle sometimes cannot be appropriately detected.

The problem to be solved by the present invention is to provide a three-dimensional object detection device whereby an adjacent vehicle can be appropriately detected even when water scale or other foreign matter adheres to the lens and the lens is clouded.

In order to solve the abovementioned problem, the present invention is a three-dimensional object detection device provided with a first three-dimensional object detection unit for detecting a three-dimensional object based on a captured image, and a second three-dimensional object detection unit for detecting a three-dimensional object based on a light source which is present behind a host vehicle, wherein a degree of lens clouding is detected, and it is assessed whether the three-dimensional object is an adjacent vehicle based on the detection result from at least the second three-dimensional object detection unit when the degree of lens clouding is equal to or greater than a predetermined determination value, and it is assessed whether the three-dimensional object is an adjacent vehicle based on at least the detection result from the first three-dimensional object detection unit when the degree of lens clouding is less than the determination value.

The detection precision of the detection result from the second three-dimensional object detection means is usually higher than that of the detection result from the first three-dimensional object detection unit when the lens is clouded, and when the lens is not clouded, the detection precision of the detection result from the first three-dimensional object detection unit is higher than that of the detection result from the second three-dimensional object detection unit. Through the present invention, the detection result from the first three-dimensional object detection unit and the detection result from the second three-dimensional object detection unit can be used in accordance with the degree of lens clouding, and an adjacent vehicle can therefore be appropriately detected in accordance with the degree to which the lens is clouded.

BRIEF DESCRIPTION OF THE DRAWINGS

Referring now to the attached drawings which form a part of this original disclosure.

DETAILED DESCRIPTION OF THE EMBODIMENTS

Figure 1:
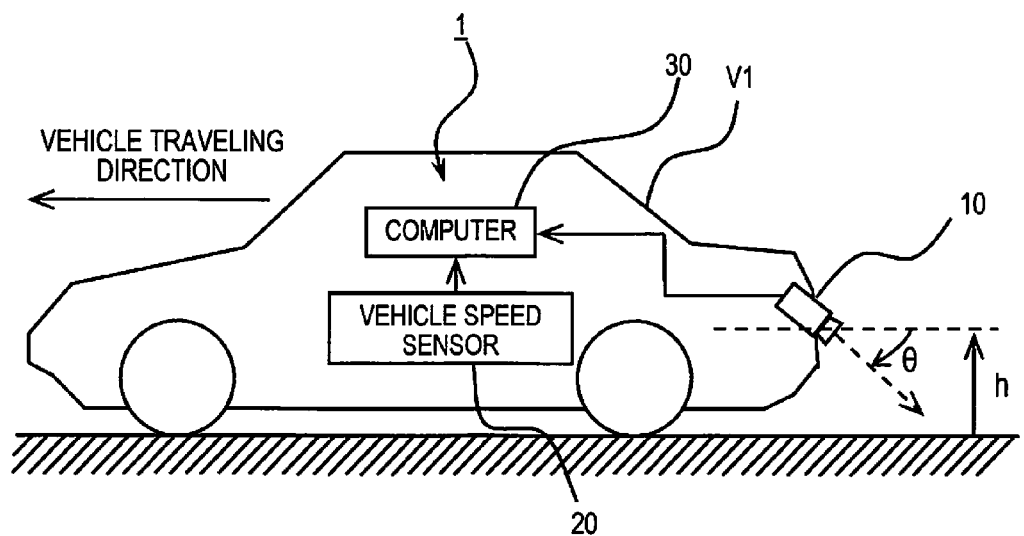
FIG. 1 is a schematic overview of a vehicle in which a three-dimensional object detection device has been mounted.

FIG. 1 is a schematic overview of a vehicle in which a three-dimensional object detection device 1 according to the present embodiment has been mounted. An object of the three-dimensional object detection device 1 according to the present embodiment is to detect another vehicle (also referred to as "adjacent vehicle V2") present in an adjacent lane where contact is possible should a host vehicle V1 change lanes. The three-dimensional object detection device 1 according to the present embodiment is provided with a camera 10, a vehicle speed sensor 20, and a computer 30, as illustrated in FIG. 1.

The camera 10 is attached to the host vehicle V1 in a location at a height h at the rear of the host vehicle V1 so that the optical axis is at an angle θ downward from the horizontal, as illustrated in FIG. 1. From this position, the camera 10 captures an image of a predetermined region of the surrounding environment of the host vehicle V1. The vehicle speed sensor 20 detects the travel speed of the host vehicle V1, and calculates the vehicle speed from a wheel speed detected by a wheel speed sensor for sensing the rotational speed of a wheel, for example. The computer 30 detects an adjacent vehicle present in an adjacent lane behind the host vehicle.

Figure 2:
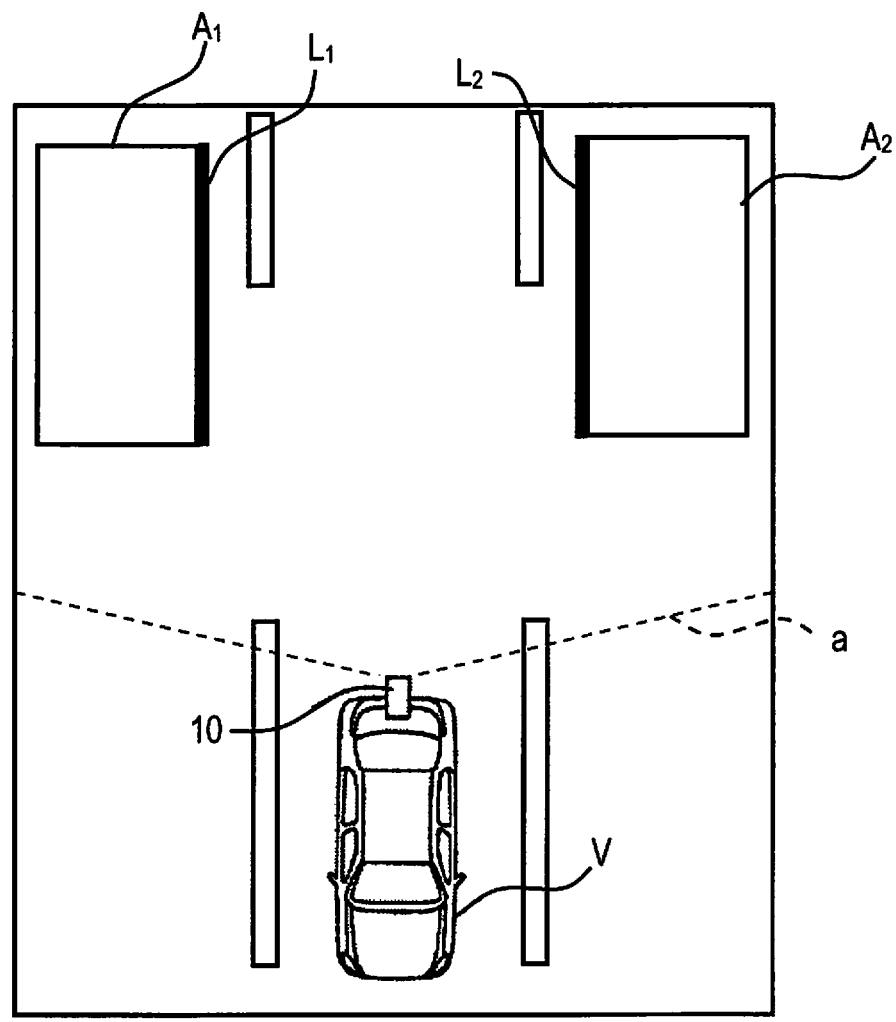
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures an image of a view rearward from the vehicle at a predetermined view angle a. At this time, the view angle a of the camera 10 is set to a view angle that allows an image of the left and right lanes (adjacent lanes) to be captured in addition to the lane in which the host vehicle V1 is traveling. The image capturable region includes detection subject regions A1, A2 which are to the rear of the host vehicle V1 and are in adjacent lanes to the left and right of the lane of travel of the host vehicle V1. In the present embodiment, "rearward from the vehicle" means not only directly rearward from the vehicle, but also rearward and to the sides of the vehicle. The region of which an image is captured rearward from the vehicle is set in accordance with the view angle of the camera 10. For example, when an angle of zero degrees is defined as being directly behind the vehicle along the vehicle length direction, the region of which an image is captured rearward from the vehicle may be set so as to include the region 0 to 90 degrees to the left and right, preferably 0 to about 70 degrees, from the direct-rear direction.

Figure 3:
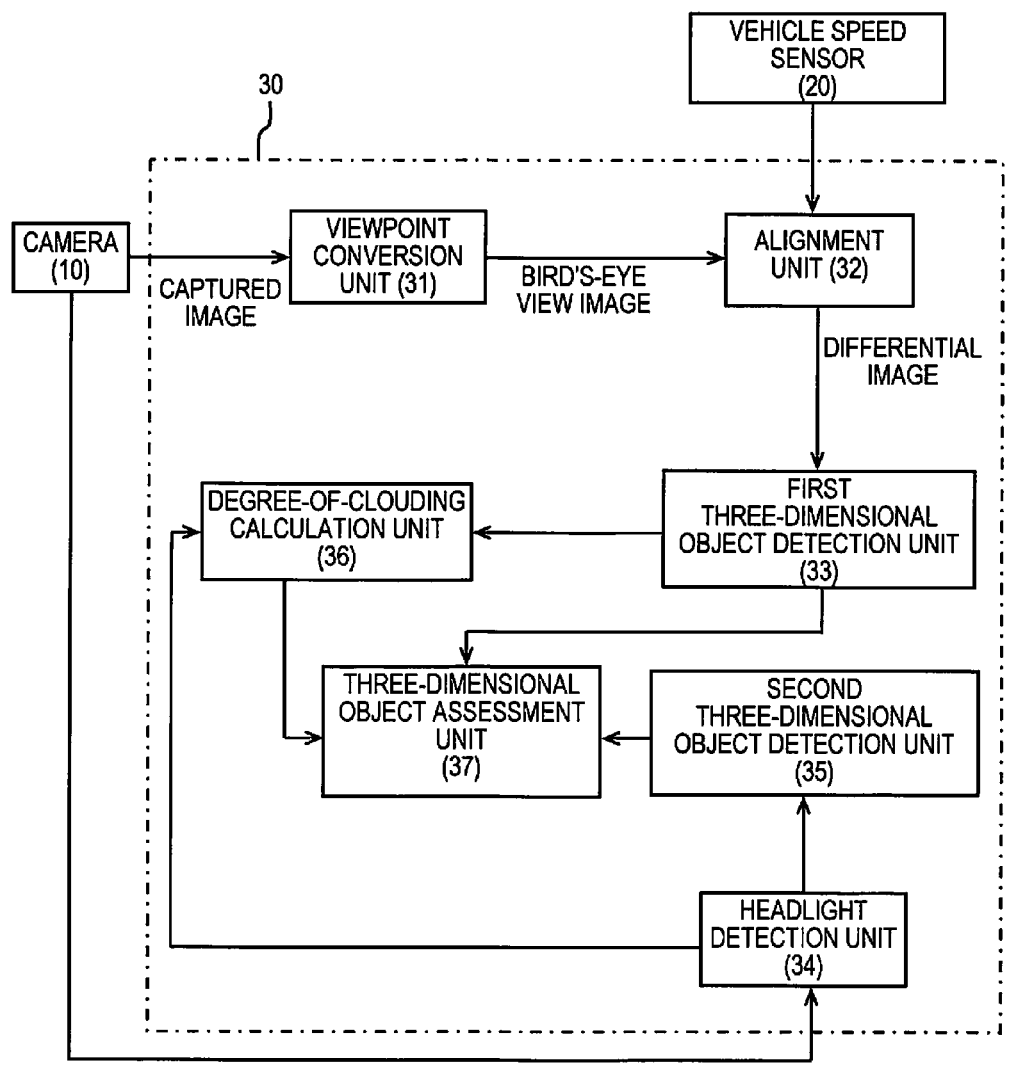
FIG. 3 is a block diagram illustrating the details of the computer.

FIG. 3 is a block view illustrating the details of the computer 30 in FIG. 1. The camera 10 and the vehicle speed sensor 20 are also illustrated in FIG. 3 in order to distinctly indicate connection relationships.

As illustrated in FIG. 3, the computer 30 is provided with a viewpoint conversion unit 31, an alignment unit 32, a first three-dimensional object detection unit 33, a headlight detection unit 34, a second three-dimensional object detection unit 35, a degree-of-clouding calculation unit 36, and a three-dimensional object assessment unit 37. The configuration of each of these units is described below.

Captured-image data of the predetermined region obtained by image capture carried out by the camera 10 are inputted to the viewpoint conversion unit 31, and the captured image data thus inputted are converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data are converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
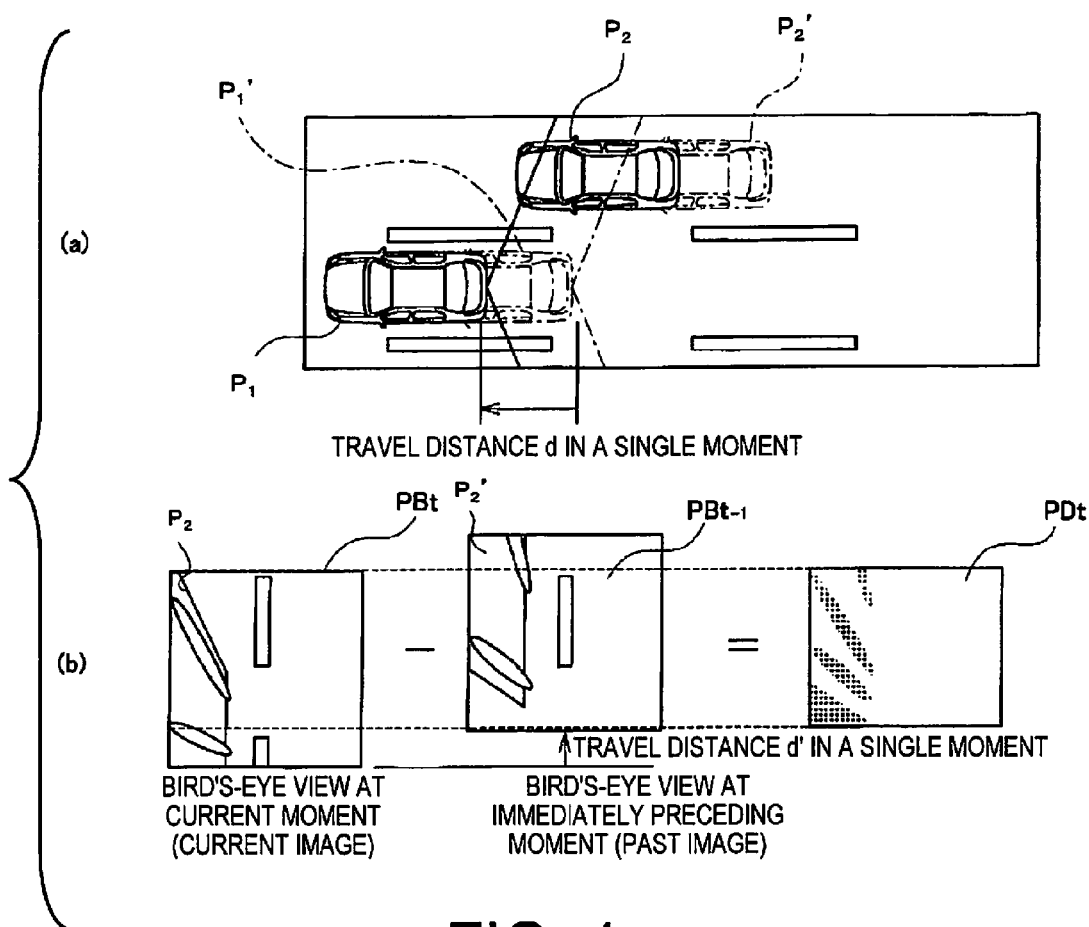
FIG. 4 is a view for describing the general overview of the processing performed by the alignment unit, with part (a) of FIG. 4 being a plan view illustrating the movement state of the vehicle, and part (b) of FIG. 4 being an image illustrating a general overview of alignment.

The bird's-eye view image data obtained by viewpoint conversion carried out by the viewpoint conversion unit 31 are sequentially inputted to the alignment unit 32, and the inputted positions of the bird's-eye view image data at different times are aligned. FIG. 4 is a view for describing the general overview of the processing performed by the alignment unit 32. Part (a) of FIG. 4 is a plan view illustrating the movement state of the host vehicle V1, and part (b) of FIG. 4 is an image illustrating a general overview of alignment.

As illustrated in part (a) of FIG. 4, the host vehicle V1 at the current time is positioned at $P_1$, and the host vehicle V1 at a single time prior is positioned at $P_1'$. It is assumed that an adjacent vehicle V2 is positioned in the rear-side direction of the host vehicle V1 and is travelling parallel to the host vehicle V1, and that the adjacent vehicle V2 at the current time is positioned at $P_2$, and the adjacent vehicle V2 at a single time prior is positioned at $P_2'$. Also, it is assumed that the host vehicle V1 has moved a distance d at a single time. The term "at a single time prior" may refer to a time that is in the past by a time interval which is set in advance (e.g., a single control cycle) from the current time, or may be a time that is in the past by an arbitrary time interval.

In such a state, a bird's-eye view image $PB_t$ at the current time is illustrated in part (b) of FIG. 4. In this bird's-eye view image $PB_t$, the white lines drawn on the road surface are rectangular and are relatively accurate in a plan view, but the adjacent vehicle V2 (position $P_2$) appears collapsed. The same applies to the bird's-eye view image $PB_{t-1}$ of a single time prior; the white lines drawn on the road surface are rectangular and are relatively accurate in a planar view, but the adjacent vehicle V2 (position $P_2'$) appears collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ of a single time prior, and matches the position with the bird's-eye view image $PB_t$ at the current time. The left-side image and the center image in part (b) of FIG. 4 illustrate a state of offset by a movement distance d'. The offset amount d' is the amount of movement in the bird's-eye view image data that corresponds to the actual movement distance d of the host vehicle V1 illustrated in part (a) of FIG. 4, and is determined based on a signal from the vehicle speed sensor 20 and the time interval from the single time prior to the current time.

In the present embodiment, the alignment unit 32 aligns the positions of the bird's-eye view images from different times in terms of the bird's-eye view and obtains the aligned bird's-eye view images, but this "alignment" process may be performed with a precision that corresponds to the type of detection object or the required detection precision. For example, strict alignment processing may be performed in which positions are aligned based on same times and same positions, or loose alignment processing may be performed for ascertaining coordinates of each bird's-eye view image.

After alignment, the alignment unit 32 obtains the difference between the bird's-eye view images $PB_t$ and $PB_{t-1}$, and generates differential image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the differential image $PD_t$ are set to "1," and when the absolute value is less than a predetermined threshold value th, the pixel values of the differential image $PD_t$ are set to "0." Differential image $PD_t$ data such as that illustrated on the right side of part (b) of FIG. 4 can thereby be generated.

The first three-dimensional object detection unit 33 generates a differential waveform based on the differential image $PD_t$ data illustrated in part (b) of FIG. 4. Specifically, the first three-dimensional object detection unit 33 generates a differential waveform in a detection region rearward and to the left and right from the host vehicle V1. In the present embodiment, each time a captured image $PD_t$ is generated, the first three-dimensional object detection unit 33 also generates a differential waveform based on the data of the generated differential image $PD_t$. In other words, the first three-dimensional object detection unit 33 repeatedly generates a differential waveform at the capture cycle (frame rate) of the captured images.

An object of the three-dimensional object detection device 1 of the present example is to calculate the movement distance for the adjacent vehicle V2 with which there is a possibility of contact should the host vehicle V1 change lanes. Accordingly, in the present example, rectangular detection regions A1, A2 are set to the left and right behind the host vehicle V1, as illustrated in FIG. 2. Such detection regions A1, A2 may be set from a relative position which is relative to the host vehicle V1, or may be set based on the position of the white lines. When the detection regions are set based on the position of the white lines, the three-dimensional object detection device 1 may use known white line recognition techniques, for example.

In the present example, borders of the set detection regions A1, A2 on the host vehicle V1 sides thereof (borders along the traveling direction) are recognized as ground lines L1, L2, as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
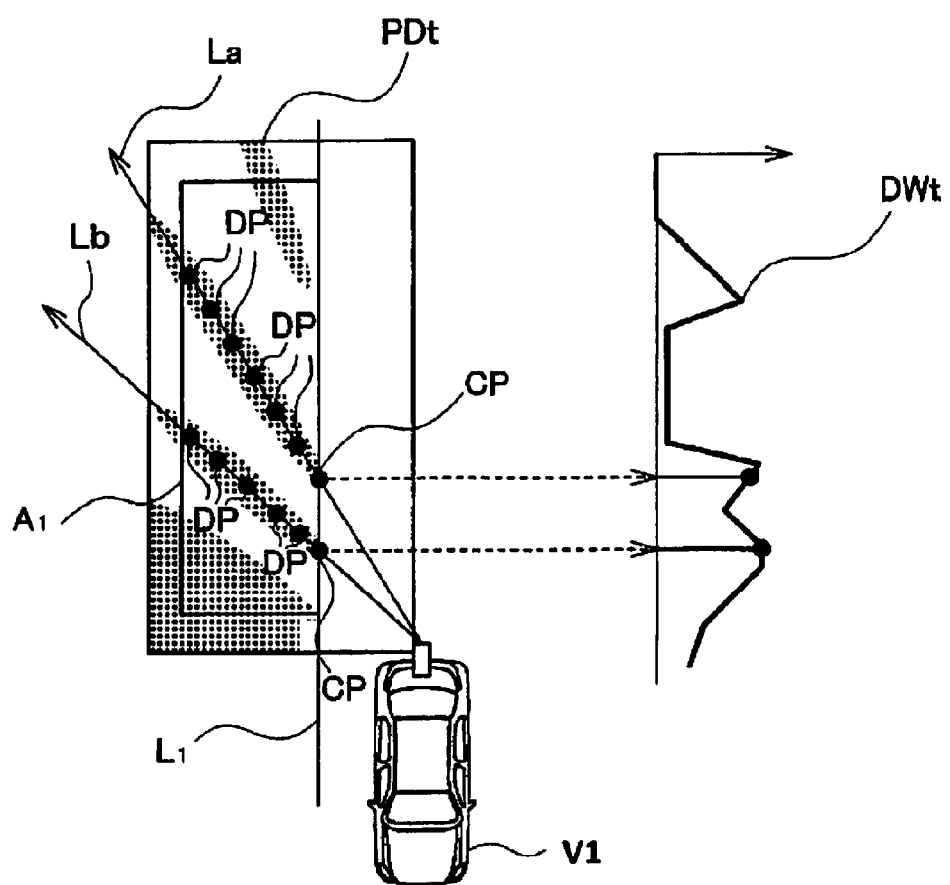
FIG. 5 is a schematic view illustrating the manner in which the differential waveform is generated by the three-dimensional object detection unit.

FIG. 5 is a schematic view illustrating the manner in which the differential waveform is generated by the first three-dimensional object detection unit 33. As illustrated in FIG. 5, the first three-dimensional object detection unit 33 generates a differential waveform $DW_t$ from a portion corresponding to the detection regions A1, A2 in the differential image $PD_t$ (drawing on the right in part (b) of FIG. 4) calculated by the alignment unit 32. In this case, the first three-dimensional object detection unit 33 generates a differential waveform $DW_t$ along the collapsing direction of the three-dimensional object due to viewpoint conversion. In the example illustrated in FIG. 5, although a description is given using only the detection region A1 for the sake of convenience, the differential waveform $DW_t$ is generated by the same procedure for the detection region A2 as well.

More specifically, the first three-dimensional object detection unit 33 first defines a line La in the direction in which the three-dimensional object collapses in the differential image $PD_t$ data. The first three-dimensional object detection unit 33 then counts the number of difference pixels DP indicating a predetermined difference on the line La. In the present embodiment, the difference pixels DP indicating a predetermined difference have pixel values in the differential image $PD_t$ that are represented by "0" and "1," and the pixels indicated by "1" are counted as difference pixels DP.

After counting the number of difference pixels DP, the first three-dimensional object detection unit 33 determines the intersection point CP of the line La and the ground line L1. The first three-dimensional object detection unit 33 then correlates the intersection point CP and the count number, decides a horizontal-axis position, i.e., the position on the axis in the vertical direction in the drawing on the right in FIG. 5, based on the position of the intersection point CP, decides the vertical-axis position, i.e., the position on the axis in the lateral direction in the drawing on the right in FIG. 5, from the count number, and plots the positions as the count number at the intersection point CP.

Similarly, the first three-dimensional object detection unit 33 defines the lines Lb, Lc, and so on in the direction in which the three-dimensional object collapses, counts the number of difference pixels DP, decides the horizontal-axis position based on the position of each intersection point CP, decides the vertical-axis position from the count number (the number of difference pixels DP), and plots the positions. The first three-dimensional object detection unit 33 repeats the above procedure in sequence to form a frequency distribution and thereby generates a differential waveform $DW_t$ as illustrated in the drawing on the right in FIG. 5.

Here, the difference pixels PD in the differential image $PD_t$ data are pixels which have changed in the image at different times, or in other words, are locations that can be construed to be where a three-dimensional object was present. Accordingly, in locations where a three-dimensional object was present, the number of pixels is counted along the direction in which the three-dimensional object collapses, a frequency distribution is formed, and a differential waveform $DW_t$ is thereby generated. In particular, since the number of pixels is counted along the direction in which the three-dimensional object collapses, the differential waveform $DW_t$ is generated from height-direction information for the three-dimensional object.

The lines La and Lb in the direction in which the three-dimensional object collapses each have different distances of overlap with the detection region A1, as illustrated in the drawing on the left in FIG. 5. Therefore, the number of difference pixels DP is greater on the line La than on the line Lb when it is assumed that the detection region A1 is filled with the difference pixels DP. For this reason, the first three-dimensional object detection unit 33 performs normalization based on the distance that the lines La, Lb in the direction in which the three-dimensional object collapses and the detection region A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the first three-dimensional object detection unit 33 divides the count number by the overlapping distance or performs normalization in another manner. The values of the differential waveform $DW_t$ that correspond to the lines La, Lb in the direction in which the three-dimensional object collapses are thereby made substantially the same, as illustrated in the differential waveform $DW_t$.

Figure 6:
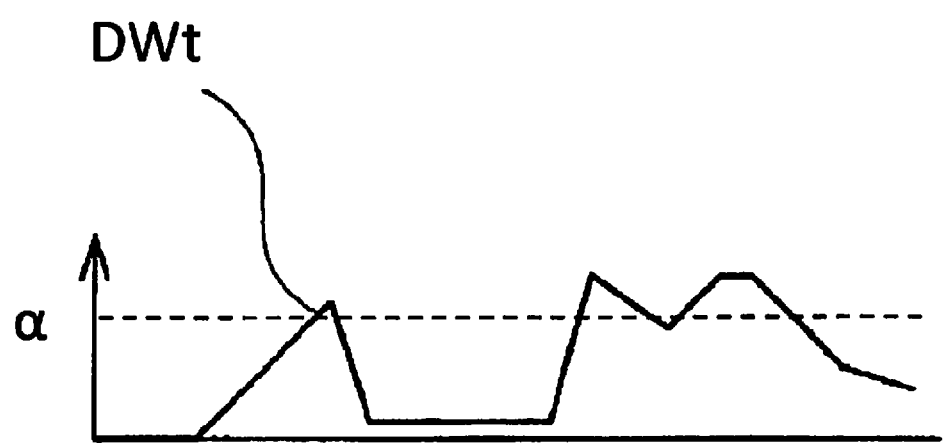
FIG. 6 is a view illustrating an example of the differential waveform and the threshold value $\alpha$ for detecting the three-dimensional object.

After the differential waveform $DW_t$ has been generated, the first three-dimensional object detection unit 33 detects a three-dimensional object present in the adjacent lane based on the generated differential waveform $DW_t$. Here, FIG. 6 is a view for describing the method whereby the first three-dimensional object detection unit 33 detects a three-dimensional object, and illustrates an example of the differential waveform $DW_t$ and the threshold value α for detecting the three-dimensional object. As illustrated in FIG. 6, the first three-dimensional object detection unit 33 assesses whether a three-dimensional object is present in the detection regions A1, A2 by assessing whether a peak of the generated differential waveform $DW_t$ is equal to or greater than a predetermined threshold value α that corresponds to a peak position of the differential waveform $DW_t$. When the peak of the differential waveform $DW_t$ is less than the predetermined threshold value α, the first three-dimensional object detection unit 33 assesses that a three-dimensional object is not present in the detection regions A1, A2. When the peak of the differential waveform $DW_t$ is equal to or greater than the predetermined threshold value α, the first three-dimensional object detection unit 33 assesses that a three-dimensional object is present in the detection regions A1, A2.

After the three-dimensional object has been detected, the first three-dimensional object detection unit 33 calculates the relative traveling speed of the three-dimensional object detected by the first three-dimensional object detection unit 33 by comparing the differential waveform $DW_t$ at the current time and the differential waveform $DW_{t-1}$ of a single time prior. In other words, the first three-dimensional object detection unit 33 calculates the relative traveling speed of the three-dimensional object with respect to the host vehicle V1 from the time variation of the differential waveform $DW_t$ and the differential waveform $DW_{t-1}$.

Figure 7:
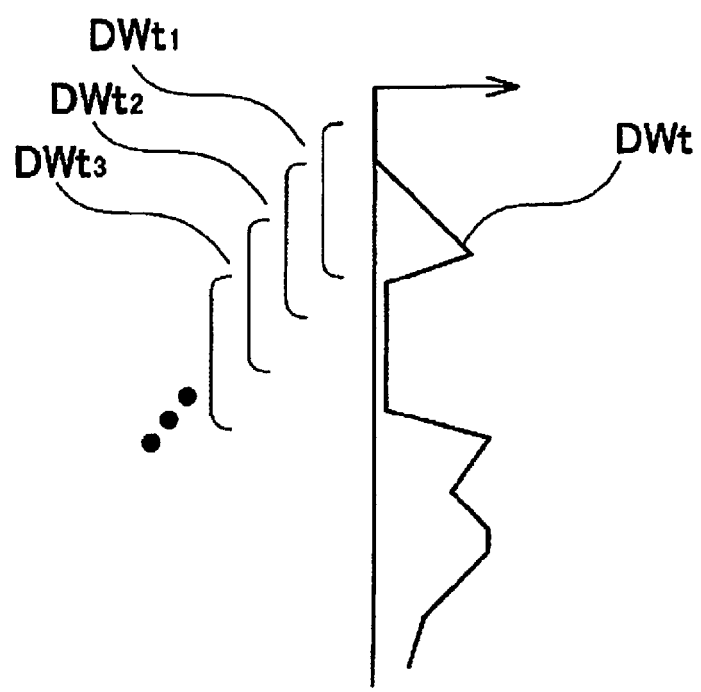
FIG. 7 is a view illustrating the small areas divided by the three-dimensional object detection unit.

More specifically, the first three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 7. FIG. 7 is a view illustrating the small areas $DW_{t1}$ to $DW_{tn}$ divided by the first three-dimensional object detection unit 33. The small areas $DW_{t1}$ to $DW_{tn}$ are divided so as to be mutually overlapping, as illustrated in, e.g., FIG. 7. For example, the small region $DW_{t1}$ and the small region $DW_{t2}$ overlap each other, and the small region $DW_{t2}$ and the small region $DW_{t3}$ overlap each other.

Next, the first three-dimensional object detection unit 33 determines the offset amount (the amount of movement in the horizontal-axis direction (vertical direction in FIG. 7) of the differential waveform) for each of the small areas $DW_{t1}$ to $DW_{tn}$. Here, the offset amount is determined from the difference (distance in the horizontal-axis direction) between the differential waveform $DW_{t-1}$ of a single time prior and the differential waveform $DW_t$ at the current time. In this case, the first three-dimensional object detection unit 33 assesses the position (the position in the horizontal-axis direction) in which the error from the differential waveform $DW_t$ at the current time is at a minimum when the differential waveform $DW_{t-1}$ of a single time prior is moved in the horizontal-axis direction for each of the small areas $DW_{t1}$ to $DW_{tn}$, and determines as the offset amount the amount of movement in the horizontal-axis direction between the original position of the differential waveform $DW_{t-1}$ and the position in which the error is at a minimum. The first three-dimensional object detection unit 33 then counts the offset amounts determined for each of the small areas $DW_{t1}$ to $DW_{tn}$ and forms a histogram.

Figure 8:
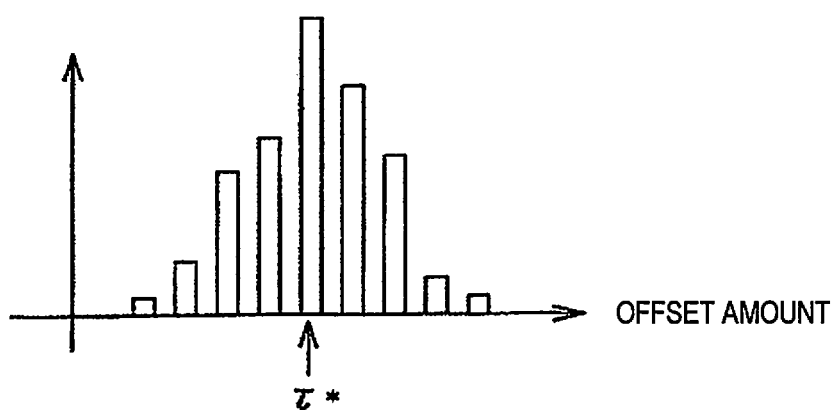
FIG. 8 is a view illustrating an example of the histogram obtained by the three-dimensional object detection unit.

FIG. 8 is a view illustrating an example of the histogram obtained by the first three-dimensional object detection unit 33. As illustrated in FIG. 8, some amount of variability occurs in the offset amount, which is amount of movement for which the error between the small areas $DW_{t1}$ to $DW_{tn}$ and the differential waveform $DW_{t-1}$ of a single time prior is at a minimum. Accordingly, the first three-dimensional object detection unit 33 forms the histogram from offset amounts which include variability and calculates the movement distance from the histogram. At this point, the first three-dimensional object detection unit 33 calculates the movement distance of the three-dimensional object (adjacent vehicle V2) from the maximum value in the histogram. In other words, in the example illustrated in FIG. 8, the first three-dimensional object detection unit 33 calculates the offset amount indicating the maximum value of the histogram as the movement distance τ*. In this manner, in the present embodiment, a more highly accurate movement distance can be calculated from the maximum value, even when there is variability in the offset amount. The movement distance τ* is the relative movement distance of the three-dimensional object (adjacent vehicle V2) in relation to the host vehicle. The first three-dimensional object detection unit 33 therefore calculates the absolute movement distance based on the obtained movement distance τ* and a signal from the vehicle speed sensor 20 when the absolute movement distance is to be calculated.

In the present embodiment, by calculating the movement distance of the three-dimensional object (adjacent vehicle V2) from the offset amount of the differential waveform $DW_t$ when the error in the differential waveforms $DW_t$ generated at different times is at a minimum in this manner, the movement distance can be calculated from the amount of offset in the waveform, which is one-dimensional information, and computation cost in calculating the movement distance can be kept low. Also, by dividing the differential waveform $DW_t$ generated at different times into a plurality of small areas $DW_{t1}$ to $DW_{tn}$, a plurality of waveforms representing the locations of each three-dimensional object can be obtained, thereby allowing the offset amount for each location of the three-dimensional object to be determined and allowing the movement distance to be determined from a plurality of offset amounts. The precision of calculating the movement distance can therefore be enhanced. In the present embodiment, the movement distance of the three-dimensional object is calculated from the time variation of the differential waveform $DW_t$, which includes height direction information. Consequently, in contrast with a case in which attention is given solely to movement of a single point, the detection location prior to the time variation and the detection location after the time variation are specified with height direction information included and therefore readily become the same location for the three-dimensional object, the movement distance is calculated from the time variation at the same location, and the precision of calculating the movement distance can be enhanced.

Figure 9:
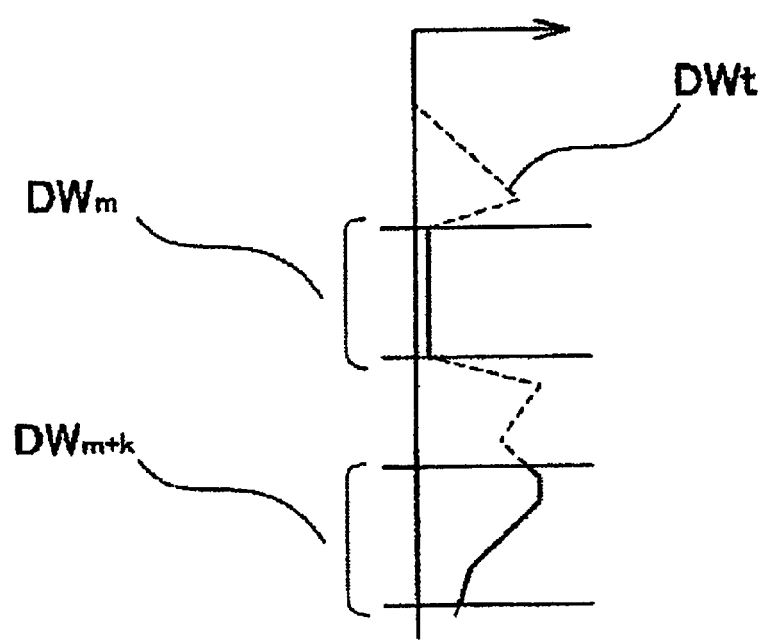
FIG. 9 is a view illustrating the weighting used by the first three-dimensional object detection unit.

When a histogram is to be formed, the first three-dimensional object detection unit 33 may impart a weighting for each of the plurality of small areas $DW_{t1}$ to $DW_{tn}$, and count the offset amounts determined for each of the small areas $DW_{t1}$ to $DW_{tn}$ in accordance with the weighting to form a histogram. FIG. 9 is a view illustrating the weighting used by the first three-dimensional object detection unit 33.

As illustrated in FIG. 9, the small region $DW_m$ (where m is an integer of 1 to n−1) is flat. In other words, in the small region $DW_m$, there is little difference between the maximum and minimum values of the count of number of pixels indicating a predetermined difference. The first three-dimensional object detection unit 33 reduces the weighting of this type of small region $DW_m$. This is because the flat small region $DW_m$ is featureless and it is highly probable that an error will be magnified when the offset amount is calculated.

Meanwhile, the small region $DW_{m+k}$ (where k is an integer of n−m or less) has a large amount of undulation. In other words, in the small region $DW_m$, there is considerable difference between the maximum and minimum values of the count of number of pixels indicating a predetermined difference. The first three-dimensional object detection unit 33 increases the weighting of this type of small region $DW_m$. This is because the small region $DW_{m+k}$ having a large amount of undulation is distinct and it is highly probable that the offset amount will be accurately calculated. Weighting in this manner makes it possible to enhance the precision of calculating the movement distance.

The differential waveform $DW_t$ is divided into a plurality of small areas $DW_{t1}$ to $DW_{tn}$ in the present embodiment in order to enhance the precision of calculating the movement distance, but division into the small areas $DW_{t1}$ to $DW_{tn}$ is not required when not much precision in calculating the movement distance is required. In this case, the first three-dimensional object detection unit 33 calculates the movement distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ of a single time prior and the differential waveform $DW_t$ at the current time is not limited to the details described above.

The first three-dimensional object detection unit 33 in the present embodiment determines the traveling speed of the host vehicle V1 (camera 10) and determines the offset amount for a stationary object from the determined traveling speed. After the offset amount of the stationary object has been determined, the first three-dimensional object detection unit 33 calculates the movement distance of the three-dimensional object, ignoring the offset amount that corresponds to the stationary object among the maximum values of the histogram.

Figure 10:
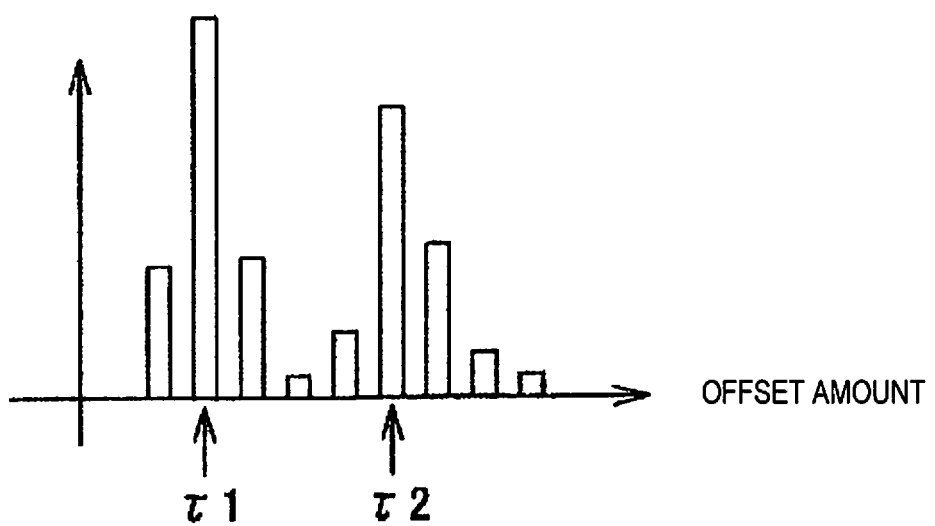
FIG. 10 is a view illustrating another example of the histogram obtained by the three-dimensional object detection unit

FIG. 10 is a view illustrating another example of the histogram obtained by the first three-dimensional object detection unit 33. When a stationary object other than the three-dimensional object is present within the view angle of the camera 10, two maximum values $\tau 1$, $\tau 2$ appear in the resulting histogram. In this case, one of the two maximum values $\tau 1$, $\tau 2$ is the offset amount of the stationary object. Consequently, the first three-dimensional object detection unit 33 determines the offset amount for the stationary object from the traveling speed, ignores the maximum value that corresponds to the offset amount, and calculates the movement distance of the three-dimensional object using the remaining maximum value. It is thereby possible to prevent a situation in which the precision of calculating the movement distance of the three-dimensional object is reduced by the stationary object.

Even when the offset amount corresponding to the stationary object is ignored, there may be a plurality of three-dimensional objects present within the view angle of the camera 10 when there is a plurality of maximum values. However, it is extremely rare for a plurality of three-dimensional objects to be present within the detection regions A1, A2. Therefore, the first three-dimensional object detection unit 33 stops calculating the movement distance. In the present embodiment, it is thereby possible to prevent a situation in which an erroneous movement distance is calculated, such as when there is a plurality of maximum values.

The first three-dimensional object detection unit 33 then assesses whether the three-dimensional object present in the adjacent lane is the adjacent vehicle V2, based on the traveling speed of the three-dimensional object. For example, the first three-dimensional object detection unit 33 assesses whether the relative traveling speed of the three-dimensional object is 10 km/h or greater, and whether the relative traveling speed of the three-dimensional object with respect to the host vehicle V1 is +60 km/h or less, and when both these conditions are satisfied, the first three-dimensional object detection unit 33 assesses that the three-dimensional object present in the adjacent lane is the adjacent vehicle V2 and detects the adjacent vehicle V2.

The reason that the first three-dimensional object detection unit 33 is configured to detect the adjacent vehicle V2 present in the adjacent lane by assessing whether the relative traveling speed of the three-dimensional object is 10 km/h or greater and the relative traveling speed of the three-dimensional object with respect to the host vehicle V1 is +60 km/h or less is described below. In the present embodiment, the detection regions A1, A2 are to the left and right behind the host vehicle V1, and emphasis is placed on whether the host vehicle V1 may possibly make contact with an adjacent vehicle should a lane change be made. Therefore, assuming that the system in the present embodiment is actuated on an expressway, when the speed of an adjacent vehicle is less than 10 km/h, even if an adjacent vehicle V2 were present, since the adjacent vehicle V2 would be positioned far behind the host vehicle V1 during a lane change, no significant problems would arise if such a three-dimensional object were not detected as the adjacent vehicle V2. Similarly, when the relative traveling speed of the adjacent vehicle V2 exceeds +60 km/h in relation to the host vehicle V1 (i.e., when the adjacent vehicle V2 is moving at a speed 60 km/h greater than the speed of the host vehicle V1), since the three-dimensional object is moving in front of the host vehicle V1 during a lane change, no significant problems would arise if such a three-dimensional object were not detected as the adjacent vehicle V2.

Depending on attachment error in the camera 10, the absolute traveling speed of a stationary object may be detected to be several kilometers per hour. However, assessing whether the absolute traveling speed of the adjacent vehicle V2 is 10 km/h or greater makes it possible to reduce the possibility that the stationary object will be assessed to be an adjacent vehicle V2. Since it is also possible for the relative speed of an adjacent vehicle V2 in relation to the host vehicle V1 to be detected to be in excess of +60 km/h due to noise, assessing whether the relative speed is +60 km/h or less makes it possible to reduce the possibility of erroneous detection due to noise. The first three-dimensional object detection unit 33 may assess a three-dimensional object present in the adjacent lane to be an adjacent vehicle V2 when the absolute traveling speed of the adjacent vehicle V2 is not negative or is not 0 km/h.

As illustrated in FIG. 3, the headlight detection unit 34 detects a light source which is a candidate for a headlight of an adjacent vehicle V2 present behind the host vehicle V1, based on the captured image captured by the camera 10. Specifically, the headlight detection unit 34 detects a light source which is a candidate for a headlight of the adjacent vehicle V2 by detecting, as a candidate region corresponding to a headlight of the adjacent vehicle V2, an image region having a difference in brightness equal to or greater than a predetermined value from a periphery and having a size equal to or greater than a predetermined area.

The second three-dimensional object detection unit 35 determines whether the light source detected by the headlight detection unit 34 corresponds to a headlight of the adjacent vehicle V2. Specifically, the second three-dimensional object detection unit 35 first calculates, as a confidence factor, the probability that the light source detected by the headlight detection unit 34 corresponds to a headlight of the adjacent vehicle V2.

For example, compared with a headlight of an adjacent vehicle V2 traveling in an adjacent lane adjacent to the lane of travel of the host vehicle V1, the headlight of an adjacent-adjacent vehicle traveling in an adjacent-adjacent lane two lanes away from the lane of travel of the host vehicle V1 or a streetlamp or other light source located off the road is detected at a position separated from the host vehicle V1. Therefore, the shorter the distance is in the vehicle width direction from the host vehicle V1 to the light source, the higher the confidence factor calculated by the second three-dimensional object detection unit 35 is that the light source detected by the headlight detection unit 34 is a headlight of an adjacent vehicle V2. The larger the light source detected by the headlight detection unit 34 is, the closer it can be assessed that the light source is to the host vehicle V1. Therefore, the larger the light source detected by the headlight detection unit 34 is, the higher the confidence factor calculated by the second three-dimensional object detection unit 35 is that the light source detected by the headlight detection unit 34 is a headlight of an adjacent vehicle V2. Furthermore, since a streetlamp or other light source is a stationary object and does not move, whereas the adjacent vehicle V2 moves, the traveling speed of the headlight of the adjacent vehicle V2 is greater than the traveling speed of a streetlamp or other stationary light source. Since a headlight of an adjacent-adjacent vehicle is detected at a position farther from the host vehicle V1 than the headlight of the adjacent vehicle V2, the traveling speed of the headlight of the adjacent vehicle V2 tends to be greater than the traveling speed of the headlight of the adjacent-adjacent vehicle. Therefore, the second three-dimensional object detection unit 35 calculates the traveling speed of the light source based on the change in position of the light source detected by the headlight detection unit 34, and the greater the traveling speed of the light source, the higher the confidence factor can be calculated that the light source is the headlight of an adjacent vehicle V2.

When the confidence factor that the light source detected by the headlight detection unit 34 is a headlight of an adjacent vehicle V2 is equal to or greater than a predetermined value, the second three-dimensional object detection unit 35 assesses that an adjacent vehicle V2 is present in the adjacent lane, and detects the adjacent vehicle V2.

The degree-of-clouding calculation unit 36 calculates, as a degree of clouding of the lens, the degree to which water scale or other foreign matter adheres to the lens of the camera 10 and the lens is clouded (a thin, white film is formed on the lens surface). The method whereby the degree-of-clouding calculation unit 36 calculates the degree of clouding of the lens will next be described.

First, the degree-of-clouding calculation unit 36 detects the number of peaks exceeding a predetermined determination threshold value in the differential waveform $DW_t$ generated by the first three-dimensional object detection unit 33. For example, in the example illustrated in FIG. 6, when the determination threshold value is the same as the threshold value α, the degree-of-clouding calculation unit 36 detects "3" as the number of peaks in the differential waveform $DW_t$ that exceed the predetermined determination threshold value. In the present embodiment, a differential waveform $DW_t$ is generated at a predetermined cycle (e.g., the capture cycle of captured images), and the degree-of-clouding calculation unit 36 detects the number of peaks exceeding the predetermined determination threshold value for the generated differential waveform $DW_t$ each time a differential waveform $DW_t$ is generated. In other words, the degree-of-clouding calculation unit 36 detects the number of peaks exceeding the predetermined determination threshold value at the cycle (capture cycle of captured images) at which the differential waveforms $DW_t$ are generated. The determination threshold value is not limited to being the same as the threshold value α, and can be set, as appropriate, in advance by experimentation or other means.

The degree-of-clouding calculation unit 36 calculates a frame score corresponding to the differential waveform $DW_t$ based on the number of peaks in the differential waveform $DW_t$ that exceed the predetermined determination threshold value. Specifically, the degree-of-clouding calculation unit 36 calculates a higher frame score the higher the degree is to which it can be assessed that the number of peaks in the differential waveform $DW_t$ is 3 or greater and a three-dimensional object (adjacent vehicle V2) is detected. For example, in the example illustrated by Table 1 below, the degree-of-clouding calculation unit 36 assesses that an adjacent vehicle V2 is not detected and calculates a score of 0 points when the number of peaks in the differential waveform $DW_t$ generated in a predetermined frame is 0 to 2, and assesses that an adjacent vehicle V2 may possibly be detected and calculates a score of 1 point when the number of peaks is 3 to 4. When the number of peaks in the differential waveform $DW_t$ is 5 to 6, the possibility of detecting an adjacent vehicle V2 is assessed to be high, and a score of 2 points is calculated, and when the number of peaks is 7 or more, the possibility of detecting an adjacent vehicle V2 is assessed to be even higher, and a score of 3 points is calculated. The frame score calculated by the degree-of-clouding calculation unit 36 is then correlated with the time at which the frame score was calculated, and is stored in a memory (not illustrated) provided to the computer 30.

TABLE 1

| | Number of peaks in differential waveform | | | |
|---|---|---|---|---|
| | 0 to 2 | 3 to 4 | 5 to 6 | 7 or more |
| Frame score | 0 points | 1 point | 2 points | 3 points |

Figure 11:
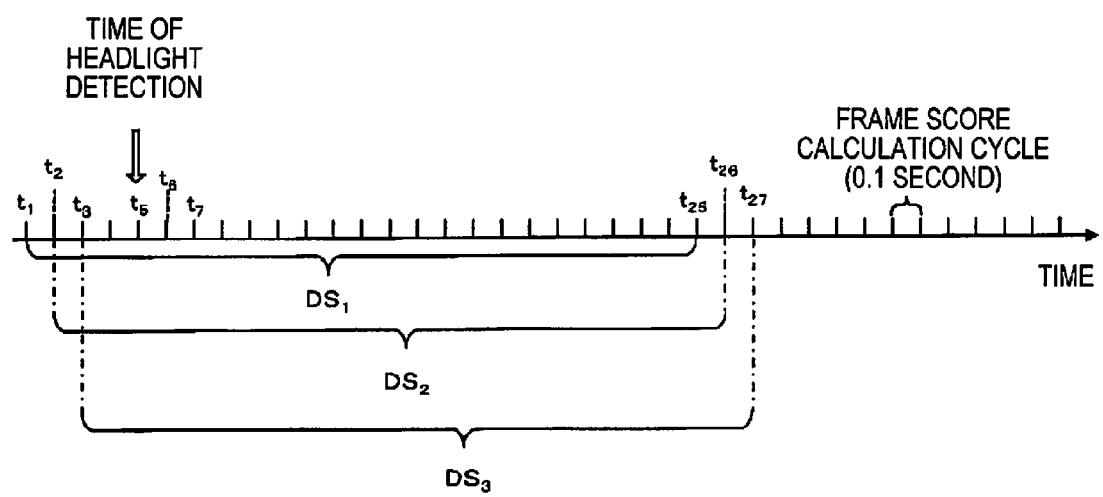
FIG. 11 is a view for describing the method for calculating the degree of lens clouding according to the present embodiment.

The degree-of-clouding calculation unit 36 then adds up the frame scores corresponding to differential waveforms DW generated within a predetermined time interval and calculates the total value of the frame scores. For example, when differential waveforms $DW_t$ are generated at a cycle of 0.1 seconds, the degree-of-clouding calculation unit 36 can acquire a 25-frame portion of frame scores generated in 2.5 seconds from the memory and calculate the total points for the 25-frame portion of frame scores, as illustrated in FIG. 11. FIG. 11 is a view for describing the method for calculating the degree of clouding of the lens, and in FIG. 11, a frame score is calculated corresponding to each differential waveform $DW_t$ at time $t_1$, time $t_2$, time $t_3$, and so on.

The degree-of-clouding calculation unit 36 then calculates a sensing score indicating the degree to which the lens is clouded, based on the total points of the frame scores calculated within a predetermined time interval. Specifically, the degree-of-clouding calculation unit 36 calculates the sensing score so that the sensing score is higher the higher the degree is to which the lens is clouded. For example, in the example illustrated by Table 2 below, when the total points for the frame scores is 0 points, since it can be assessed that a three-dimensional object (adjacent vehicle V2) is not detected, the degree-of-clouding calculation unit 36 assesses that water scale or other foreign matter is adhering to the lens, and it is highly probable that the lens is clouded, and the degree-of-clouding calculation unit 36 calculates a sensing score of "+5." In contrast, when the total points for the frame scores is 10 or greater, since it can be assessed that it is highly probable that an adjacent vehicle V2 is detected, the degree-of-clouding calculation unit 36 assesses that it is highly probable that the lens is not clouded, and calculates a sensing score of "−3."

TABLE 2

| | Total points for frame scores | | | | |
|---|---|---|---|---|---|
| | 0 points | 1 to 2 points | 3 to 5 points | 6 to 9 points | 10 or more points |
| Sensing score | +5 | +3 | +1 | −1 | −3 |

As illustrated in Tables 1 and 2, the degree-of-clouding calculation unit 36 provides an upper limit to the frame score and the sensing score. In other words, as illustrated in Table 1, when the number of peaks in the differential waveform equal to or greater than the predetermined determination threshold value is 7 or greater, the degree-of-clouding calculation unit 36 uniformly calculates "3" for the frame score. As illustrated in Table 2, when the total points for the frame score is 10 or greater, the degree-of-clouding calculation unit 36 uniformly calculates "−3" for the sensing score. Through this configuration, when the adjacent vehicle V2 is a long-bodied truck or the like, and a large number of peaks in the differential waveform is prone to being detected (e.g., seven or more peaks are detected in the differential waveform even when the lens is clouded), for example, it is possible to effectively prevent a low sensing score from being detected and the lens from being assessed as not being clouded despite actually being clouded.

The degree-of-clouding calculation unit 36 repeatedly calculates a sensing score at the cycle (e.g., the capture cycle of capture images) at which the differential waveforms $DW_t$ are generated. For example, in the example illustrated in FIG. 11, at time $t_{25}$, the degree-of-clouding calculation unit 36 first calculates a sensing score $DS_1$ for the 25 frames from time $t_1$ to time $t_{25}$. Then, at time $t_{26}$, the degree-of-clouding calculation unit 36 calculates a sensing score $DS_2$ for the 25 frames from time $t_2$ to time $t_{26}$. Similarly, sensing scores $DS_3$, $DS_4$, and so on are calculated, the corresponding frame scores being offset by one cycle at a time.

Figure 12:
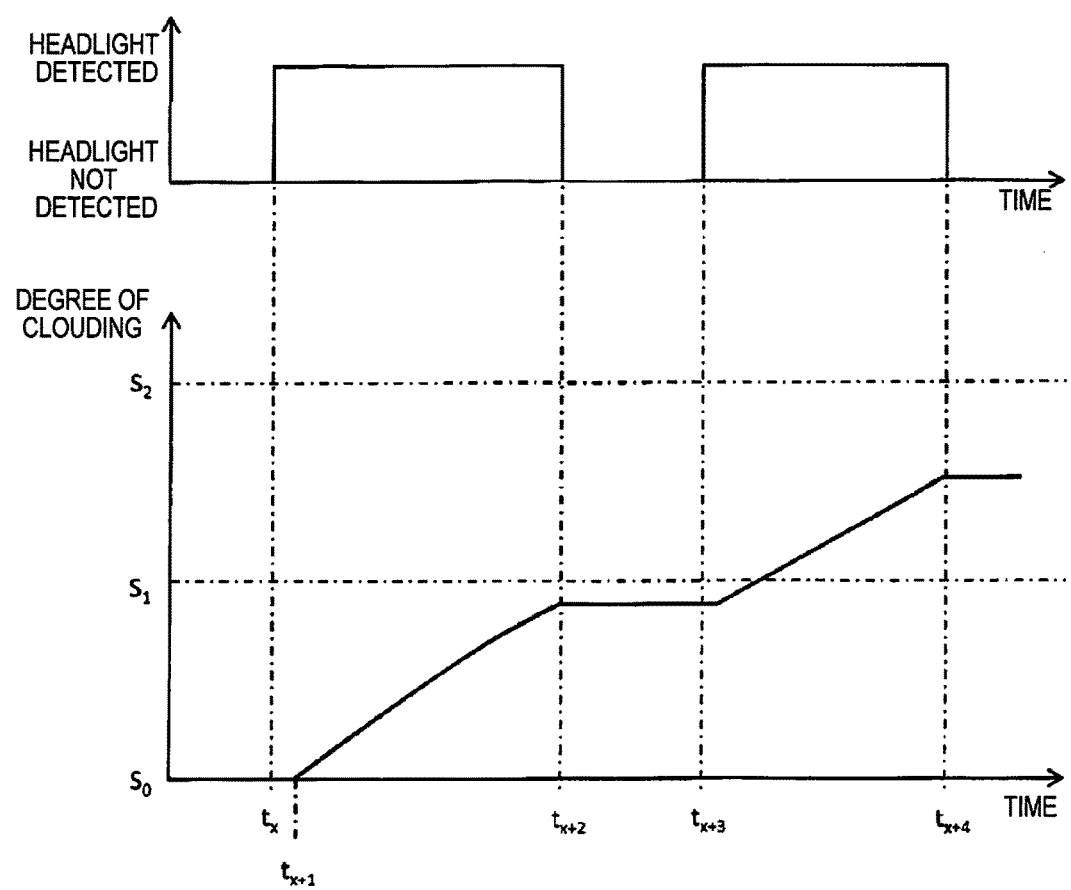
FIG. 12 is a view illustrating an example of the degree of clouding of the lens according to the present embodiment.

The degree-of-clouding calculation unit 36 integrates the calculated sensing scores and calculates the integrated value of the sensing scores as the degree of clouding of the lens. Here, FIG. 12 is a view illustrating an example of the degree of clouding of the lens, the drawing at the top of FIG. 12 illustrates the headlight detection timing for an adjacent vehicle V2, and the drawing at the bottom of FIG. 12 illustrates an example of a time course for the degree of lens clouding. In the present embodiment, when a headlight of an adjacent vehicle V2 is detected by the headlight detection unit 34, the degree-of-clouding calculation unit 36 initiates calculation of the sensing scores described above, and while the headlight of the adjacent vehicle V2 is being detected, the degree-of-clouding calculation unit 36 repeatedly calculates sensing scores, and calculates the integrated value of the sensing scores as the degree of clouding of the lens, as illustrated in FIG. 12. In the example illustrated in FIG. 12, since frame scores for a predetermined amount of time after the headlight of the adjacent vehicle V2 is detected (e.g., for two seconds after the headlight is detected) are taken into account to calculate the sensing scores, calculation of the degree of clouding of the lens is initiated at time $t_{x+1}$ slightly after time $t_x$ at which the headlight of the adjacent vehicle V2 is detected.

In other words, when the headlight of the adjacent vehicle V2 is detected and calculation of sensing scores is initiated, the degree-of-clouding calculation unit 36 initiates calculation of the degree of lens clouding by using the time at which the headlight of the adjacent vehicle V2 was detected as a reference time and calculating sensing scores based on the total value of frame scores calculated within a time interval from a time slightly before the reference time to a time a predetermined time interval from the reference time. For example, in the example illustrated in FIG. 11, frame scores are calculated at a 0.1-second cycle, and the headlight of the adjacent vehicle V2 is detected at time $t_5$. In this case, using the time $t_5$ at which the headlight of the adjacent vehicle V2 was detected as the reference time, the degree-of-clouding calculation unit 36 calculates a sensing score based on the total points of the 25-frame portion of frame scores calculated in the 2.5 seconds from time $t_1$ 0.5 seconds before (slightly before) the reference time $t_5$ to time $t_{25}$ two seconds after the reference time $t_5$. After the headlight of the adjacent vehicle V2 has been detected, as well as while the headlight of the adjacent vehicle V2 is detected, the degree-of-clouding calculation unit 36 repeatedly calculates sensing scores based on the total points of the 25-frame portion of frame scores calculated in the 2.5 seconds from the time 0.5 seconds before the reference time to the time two seconds after the reference time, while offsetting the reference time from time $t_5$ at which the headlight of the adjacent vehicle V2 was detected to time $t_6$, $t_7$, and so on, one cycle at a time.

As illustrated in FIG. 12, after the headlight of the adjacent vehicle V2 is detected, the degree-of-clouding calculation unit 36 stops calculating the degree of clouding at time $t_{x+2}$ when the headlight of the adjacent vehicle V2 is no longer detected, and maintains the degree of clouding at the same value until a headlight of an adjacent vehicle V2 is again detected. When a headlight of a second adjacent vehicle V2 is subsequently detected (time $t_{x+3}$), calculation of the degree of clouding of the lens is resumed, and calculation of the degree of clouding of the lens is repeated until time $t_{x+4}$ at which the headlight of the adjacent vehicle V2 is again no longer detected.

In the present embodiment, a lower-limit value $S_0$ and an upper-limit value $S_2$ may be provided to the value of the degree of clouding of the lens, as illustrated in FIG. 12. For example, in the examples illustrated in Tables 1 and 2 above, the lower-limit value $S_0$ may be set to 0, and the upper-limit value $S_2$ may be set to 100. By this configuration in which a lower-limit value $S_0$ is provided to the degree of clouding of the lens, even when sensing scores having low values are calculated and the degree of clouding of the lens (i.e., the integrated value of the sensing scores) has a trend of low values despite the lens actually being clouded, due to the presence of a truck or other adjacent vehicle V2 for which peaks in the differential waveform are numerous and easily detected in the detection regions A1, A2, for example, when the truck or other adjacent vehicle V2 leaves the detection regions A1, A2 and the calculated sensing scores change to high values, the degree of clouding of the lens (i.e., the integrated value of the sensing scores) attains a high value in a relatively short time, and it is therefore possible to appropriately assess that the lens is clouded. Similarly, by a configuration in which an upper-limit value $S_2$ is provided to the degree of clouding of the lens, even when the degree of clouding of the lens has a trend of high values despite the lens not actually being clouded, due to the absence of an adjacent vehicle V2 in the periphery, when an adjacent vehicle V2 is detected, the degree of clouding of the lens attains a low value in a relatively short time, and it is therefore possible to appropriately assess that the lens is not clouded.

As illustrated in FIG. 3, the three-dimensional object assessment unit 37 assesses whether an adjacent vehicle V2 is present based on the detection result for the adjacent vehicle V2 detected by the first three-dimensional object detection unit 33, and the detection result for the adjacent vehicle V2 detected by the second three-dimensional object detection unit 35.

Specifically, when an adjacent vehicle V2 is detected by the first three-dimensional object detection unit 33, the three-dimensional object assessment unit 37 sets the detection result of the first three-dimensional object detection unit 33 to "1," and when an adjacent vehicle V2 is not detected by the first three-dimensional object detection unit 33, the three-dimensional object assessment unit 37 calculates the detection result of the first three-dimensional object detection unit 33 as "0." Similarly, when an adjacent vehicle V2 is detected by the second three-dimensional object detection unit 35, the three-dimensional object assessment unit 37 sets the detection result of the second three-dimensional object detection unit 35 to "1," and when an adjacent vehicle V2 is not detected by the second three-dimensional object detection unit 35, the three-dimensional object assessment unit 37 calculates the detection result of the second three-dimensional object detection unit 35 as "0."

The three-dimensional object assessment unit 37 then imparts a weighting to the detection result of the first three-dimensional object detection unit 33 (first detection result) and the detection result of the second three-dimensional object detection unit 35 (second detection result) based on the degree of clouding of the lens calculated by the degree-of-clouding calculation unit 36, as indicated in Formula 1 below, and assesses whether the total value of the weighted detection result of the first three-dimensional object detection unit 33 (first detection result) and detection result of the second three-dimensional object detection unit 35 (second detection result) is equal to or greater than a predetermined vehicle determination threshold value $s_c$.

$$\text{First detection result} \times W_{c1} + \text{Second detection result} \times W_{c2} \geq \text{Vehicle determination threshold value } s_c \quad \text{Formula 1}$$

The term $W_{c1}$ is the weighting for the detection result of the first three-dimensional object detection unit 33 (first detection result), and the term $W_{c2}$ is the weighting for the detection result of the second three-dimensional object detection unit 35 (second detection result).

Here, when the degree of clouding of the lens is high, since a portion of the luminous flux from the subject is obscured by water scale or other foreign matter adhering to the lens and is diffusely reflected, an image of the adjacent vehicle V2 cannot be appropriately captured. As a result, the differential waveform $DW_t$ due to the adjacent vehicle V2 cannot be appropriately generated. Therefore, when the lens is clouded, the detection precision of detection results by the first three-dimensional object detection unit based on the differential waveform $DW_t$ tends to decrease. In contrast, even when the lens is clouded, a high-luminance image of a headlight of an adjacent vehicle V2 is not easily affected by lens clouding, and a detection result of the first three-dimensional object detection unit 33 based on a headlight can be obtained with relatively high precision. Therefore, the higher the degree of clouding of the lens is, the smaller the relative amount of weighting $W_{c1}$ of the detection result of the first three-dimensional object detection unit 33 is, and the larger the relative amount of weighting $W_{c2}$ of the detection result of the second three-dimensional object detection unit 35 is by the three-dimensional object assessment unit 37. When water scale or other foreign matter is not adhering to the lens, and the lens is not clouded, the detection precision of the detection result from the first three-dimensional object detection unit 33 for detecting the vehicle body of an adjacent vehicle V2 as a differential waveform tends to be higher than the detection precision of the detection result from the second three-dimensional object detection unit 35. Therefore, the lower the degree of clouding of the lens is, the larger the relative amount of weighting $W_{c1}$ of the detection result of the first three-dimensional object detection unit 33 is, and the smaller the relative amount of weighting $W_{c2}$ of the detection result of the second three-dimensional object detection unit 35 is by the three-dimensional object assessment unit 37.

For example, in the example illustrated in FIG. 12, when the lower-limit value $S_0$ is 0, and the upper-limit value $S_2$ is 100, the three-dimensional object assessment unit 37 may assess that the lens is clouded when the degree of clouding of the lens exceeds a predetermined value $S_1$ (e.g., 50), and may assess that the lens is not clouded when the degree of clouding of the lens does not exceed the predetermined value $S_1$ (e.g., 50). In this case, the three-dimensional object assessment unit 37 assesses that the lens is clouded when the degree of clouding of the lens exceeds the predetermined value $S_1$ (e.g., 50), and may make the weighting Wc1 of the detection result of the first three-dimensional object detection unit 33 smaller and make the weighting $W_{c2}$ of the detection result of the second three-dimensional object detection unit 35 larger the higher the degree of clouding of the lens is. Meanwhile, the three-dimensional object assessment unit 37 assesses that the lens is not clouded when the degree of clouding of the lens does not exceed the predetermined value $S_1$ (e.g., 50), and may make the weighting Wc1 of the detection result of the first three-dimensional object detection unit 33 larger and make the weighting $W_{c2}$ of the detection result of the second three-dimensional object detection unit 35 smaller the lower the degree of clouding of the lens is.

The three-dimensional object assessment unit 37 assesses that an adjacent vehicle V2 is present when the total value of the determination result based on Formula 1, the detection result of the first three-dimensional object detection unit 33 (first detection result), and the detection result of the second three-dimensional object detection unit 35 (second detection result) is equal to or greater than the predetermined vehicle determination threshold value $s_c$, and assesses that an adjacent vehicle V2 is not present when the total value of the detection result of the first three-dimensional object detection unit 33 (first detection result) and the detection result of the second three-dimensional object detection unit 35 (second detection result) is less than the predetermined vehicle determination threshold value $s_c$.

Figure 13:
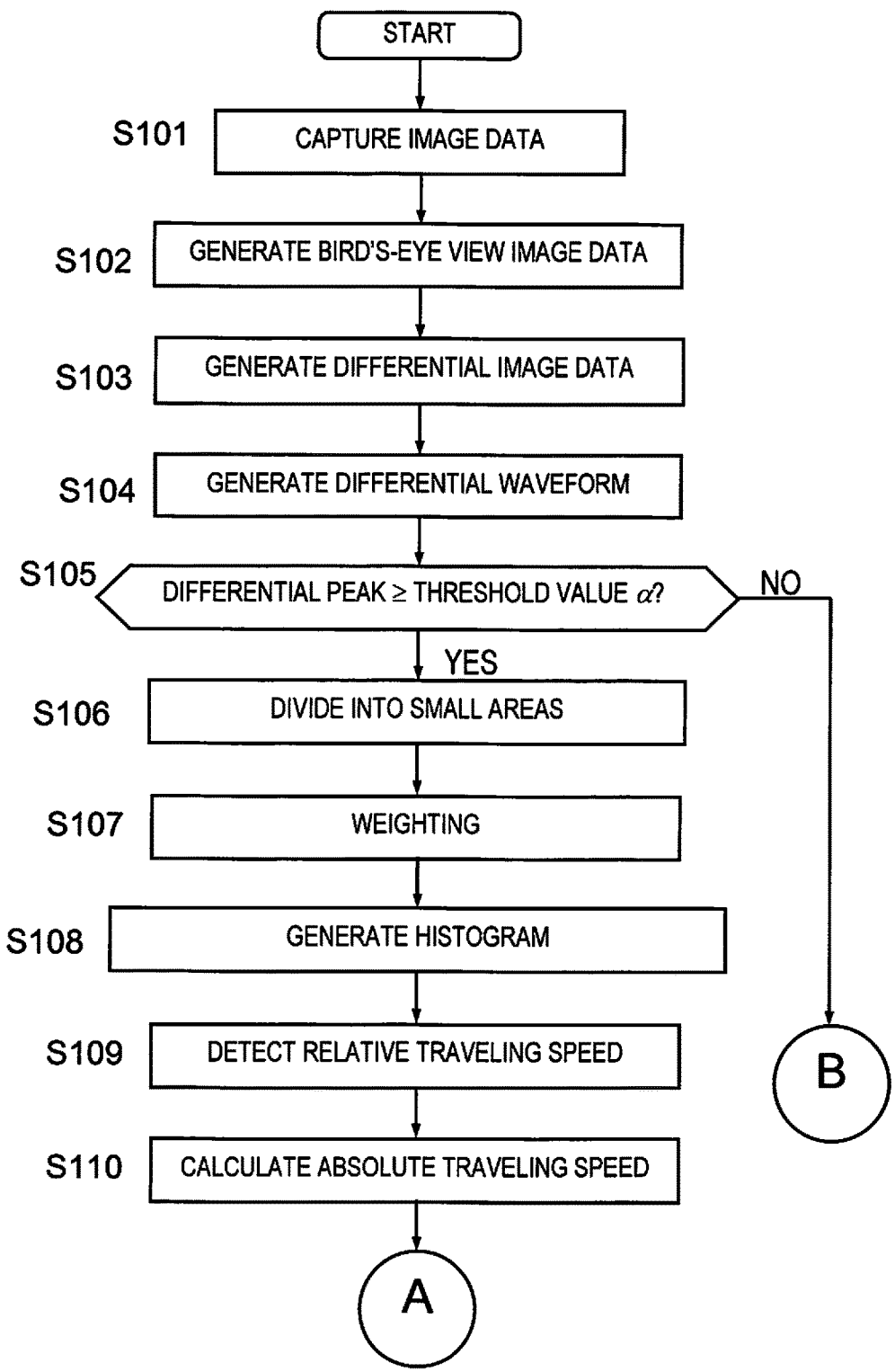
FIG. 13 is a flowchart (part 1) illustrating the adjacent-vehicle detection process according to the first embodiment.
Figure 14:
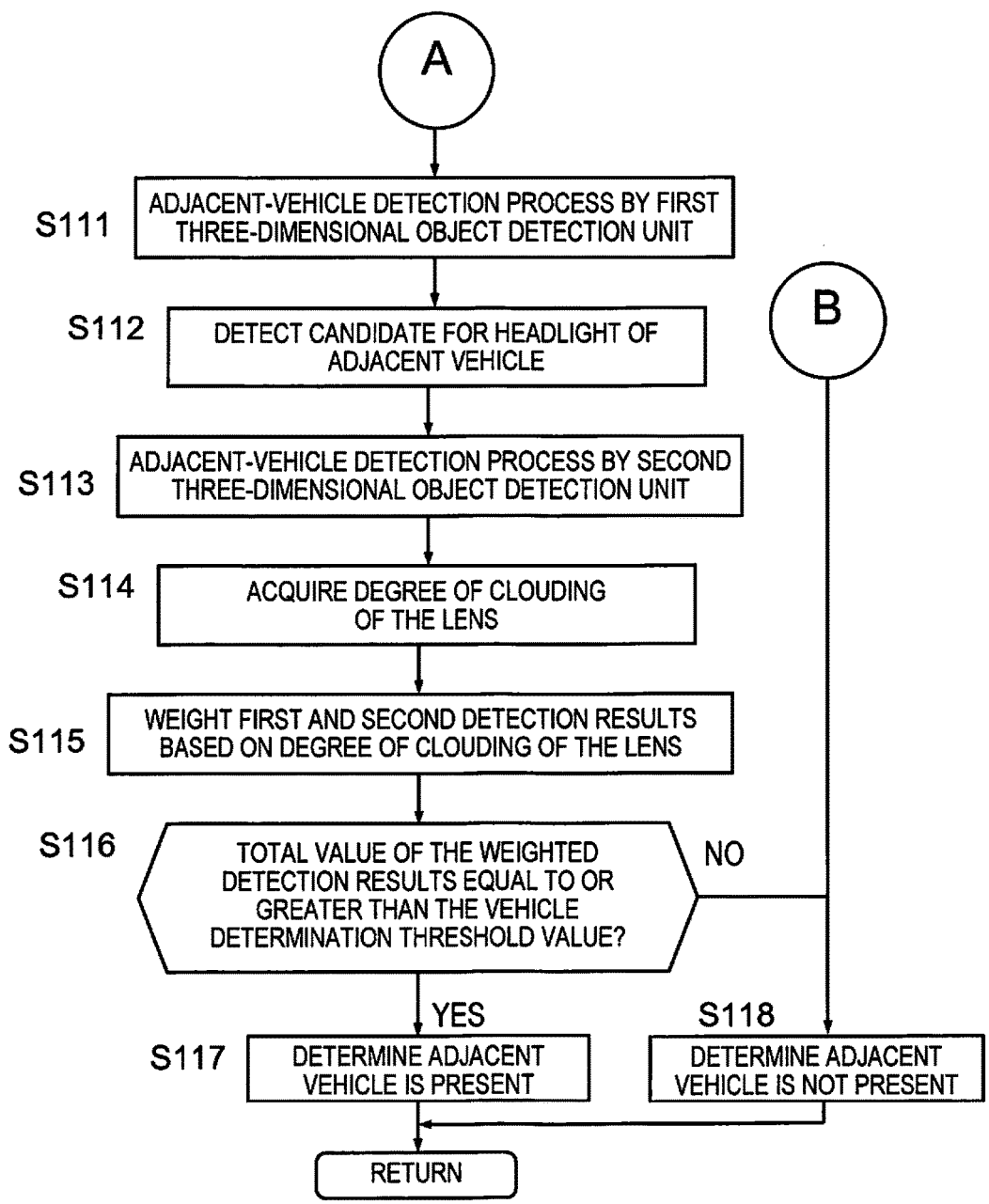
FIG. 14 is a flowchart (part 2) illustrating the adjacent-vehicle detection process according to the first embodiment.

The adjacent-vehicle detection process according to the present embodiment will next be described with reference to FIGS. 13 and 14. FIGS. 13 and 14 are flowcharts illustrating the adjacent-vehicle detection process according to a first embodiment. In the present embodiment, this adjacent-vehicle detection process is executed in parallel with the degree-of-clouding calculation process described hereinafter. The adjacent-vehicle detection process of the present embodiment is repeatedly performed at a predetermined cycle (e.g., a 0.1-second cycle). For the sake of convenience, processing performed for the detection region A1 is described below, but the same processing is performed for the detection region A2.

As illustrated in FIG. 13, data of a captured image is first acquired by the computer 30 from the camera 10 (step S101), and data of a bird's-eye view image $PB_t$ is generated (step S102) based on the data of the captured image thus acquired.

The alignment unit 32 then aligns the data of the bird's-eye view image $PB_t$ and the data of the bird's-eye view image $PB_{t-1}$ of a single time prior, and generates differential image $PD_t$ data (step S103). Specifically, the alignment unit 32 takes the absolute value of the difference between the pixel values of the bird's-eye view images $PB_t$ and $PB_{t-1}$, sets the pixel values of the differential image $PD_t$ to "1" when the absolute value is equal to or greater than a predetermined difference threshold value th, and sets the pixel values of the differential image $PD_t$ to "0" when the absolute value is less than the predetermined difference threshold value th. The first three-dimensional object detection unit 33 then counts the number of difference pixels DP having a pixel value of "1" from the differential image $PD_t$ data and generates a differential waveform $DW_t$ (step S104).

In step S105, the first three-dimensional object detection unit 33 assesses whether a peak in the differential waveform $DW_t$ is equal to or greater than a predetermined threshold value α. When the peak of the differential waveform $DW_t$ is not equal to or greater than the threshold value α, i.e., when there is essentially no difference, a three-dimensional object is not considered to be present in the captured image. Accordingly, when it has been assessed that the peak of the differential waveform $DW_t$ is not equal to or greater than the threshold value α (step S105=No), the process proceeds to step S118 in FIG. 14, and the first three-dimensional object detection unit 33 assesses that a three-dimensional object is not present and an adjacent vehicle V2 is not present. The process then returns to step S101, and the processing illustrated in FIGS. 13 and 14 is repeated.

On the other hand, when the peak in the differential waveform $DW_t$ is assessed to be equal to or greater than the threshold value α (step S105=Yes), the first three-dimensional object detection unit 33 assesses that a three-dimensional object is present in the adjacent lane, the process proceeds to step S106, and the first three-dimensional object detection unit 33 divides the differential waveform $DW_t$ into a plurality of small areas $DW_{t1}$ to $DW_{tn}$ (step S106) and applies weighting for each of the divided small areas $DW_{t1}$ to $DW_{tn}$ (step S107). An offset amount is then calculated for each of the small areas $DW_{t1}$ to $DW_{tn}$, and a histogram is generated in which the weighting is considered (step S108).

The first three-dimensional object detection unit 33 calculates the relative movement distance, which is the movement distance of the three-dimensional object in relation to the host vehicle V1, based on the histogram (step S109). The first three-dimensional object detection unit 33 then calculates the absolute traveling speed of the three-dimensional object from the relative movement distance (step S110). At this time, the first three-dimensional object detection unit 33 differentiates the relative movement distance with respect to time to calculate the relative traveling speed, adds the host vehicle speed detected by the vehicle speed sensor 20, and calculates the absolute traveling speed.

In step S111, the first three-dimensional object detection unit 33 detects an adjacent vehicle V2. Specifically, the first three-dimensional object detection unit 33 assesses whether the three-dimensional object present in the adjacent lane is an adjacent vehicle V2 by assessing whether the absolute traveling speed of the three-dimensional object is 10 km/h or greater and the relative traveling speed of the three-dimensional object relative to the host vehicle V1 is +60 km/h or less. When both these conditions are met, the first three-dimensional object detection unit 33 assesses that the three-dimensional object present in the adjacent lane is an adjacent vehicle V2, and detects the adjacent vehicle V2 present in the adjacent lane. When either of the abovementioned conditions is not met, the first three-dimensional object detection unit 33 assesses that the three-dimensional object present in the adjacent lane is not an adjacent vehicle V2, and an adjacent vehicle V2 is not detected.

In step S112, the headlight detection unit 34 detects a light source which is a candidate for a headlight of an adjacent vehicle V2. Specifically, the headlight detection unit 34 detects a light source which is a candidate for a headlight of the adjacent vehicle V2 by detecting, as a candidate region corresponding to a headlight of the adjacent vehicle V2, an image region having a difference in brightness equal to or greater than a predetermined value from a periphery and having a size equal to or greater than a predetermined area based on the captured image captured by the camera 10.

In step S113, the second three-dimensional object detection unit detects an adjacent vehicle V2 based on the light source which is a candidate for a headlight of the adjacent vehicle V2 detected in step S112. Specifically, the second three-dimensional object detection unit 35 calculates the confidence factor that the light source detected in step S112 is a headlight of an adjacent vehicle V2, and when the calculated confidence factor is equal to or greater than a predetermined value, the second three-dimensional object detection unit 35 assesses that the three-dimensional object present in the adjacent lane is an adjacent vehicle V2, and detects the adjacent vehicle V2 present in the adjacent lane. When a light source as a candidate for a headlight of an adjacent vehicle V2 is not detected in step S112, or the confidence factor that the light source detected in step S112 is a headlight of an adjacent vehicle V2 is less than the predetermined value, it is assessed that the three-dimensional object present in the adjacent lane is not an adjacent vehicle V2, and an adjacent vehicle V2 is not detected.

In step S114, the three-dimensional object assessment unit 37 acquires the degree of lens clouding calculated by the degree-of-clouding calculation process described hereinafter. In step S115, the three-dimensional object assessment unit 37 imparts weighting to the detection result from the first three-dimensional object detection unit 33 obtained in step S111 and to the detection result from the second three-dimensional object detection unit 35 obtained in step S113, based on the degree of lens clouding acquired in step S114. Specifically, the higher the degree of lens clouding is, the smaller the weighting $W_{c1}$ of the detection result of the first three-dimensional object detection unit 33 is, and the larger the weighting $W_{c2}$ of the detection result of the second three-dimensional object detection unit 35 is by the three-dimensional object assessment unit 37.

In step S116, the three-dimensional object assessment unit 37 assesses whether the total value of the detection results weighted in step S115 exceeds the predetermined vehicle determination threshold value $s_c$, as illustrated in Formula 1 above. When the total value of the weighted detection result of the first three-dimensional object detection unit 33 and detection result of the second three-dimensional object detection unit 35 exceeds the predetermined vehicle determination threshold value $s_c$, the process proceeds to step S117, and it is assessed that an adjacent vehicle V2 is present. When the predetermined vehicle determination threshold value is not exceeded, the process proceeds to step S118, and it is assessed that an adjacent vehicle V2 is not present.

In the present embodiment, since emphasis is placed on whether the host vehicle V1 may possibly make contact should a lane change be made, when an adjacent vehicle V2 is detected in step S117, a warning sound may be issued to the driver of the host vehicle, or a display corresponding to a warning may be produced by a predetermined display device.

Figure 15:
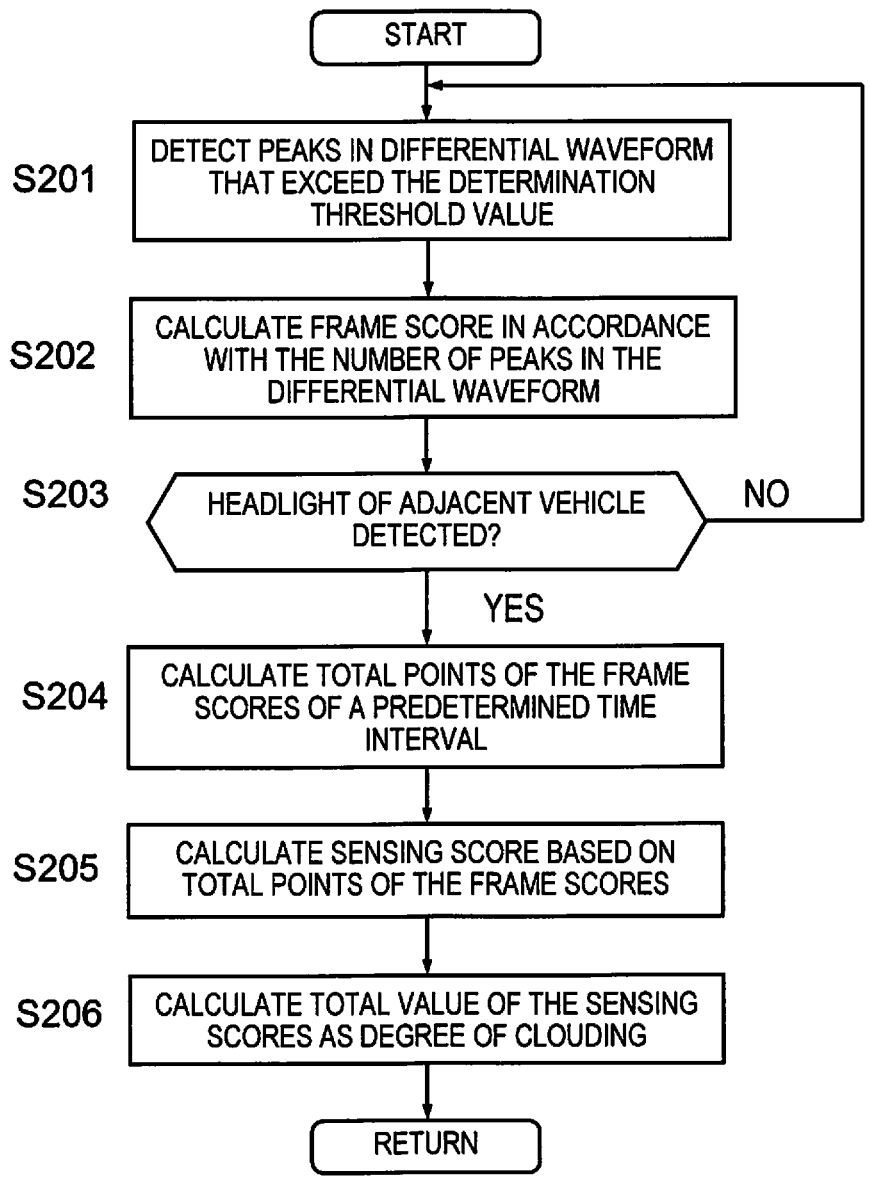
FIG. 15 is a flowchart illustrating the degree-of-clouding calculation process according to the first embodiment.

The degree-of-clouding calculation process according to the present embodiment will next be described with reference to FIG. 15. FIG. 15 is a flowchart illustrating the degree-of-clouding calculation process according to the first embodiment. The degree-of-clouding calculation process described below is executed at a predetermined cycle (e.g., a 0.1-second cycle). The degree-of-clouding calculation process described below is performed in parallel with the adjacent-vehicle detection process described above, and the degree of clouding of the lens calculated in this degree-of-clouding calculation process is used during detection of an adjacent vehicle V2 in the adjacent-vehicle detection process described above.

In step S201, the degree-of-clouding calculation unit 36 first detects the number of peaks exceeding a predetermined determination threshold value in the differential waveform $DW_t$ generated by the adjacent-vehicle detection process described above. For example, in the example illustrated in FIG. 6, when the predetermined determination threshold value is the same as the threshold value $\alpha$, the degree-of-clouding calculation unit 36 detects "3" as the number of peaks in the differential waveform $DW_t$ that exceed the predetermined determination threshold value.

In step S202, the degree-of-clouding calculation unit 36 calculates frame scores based on the number of peaks in the differential waveform $DW_t$ detected in step S201, as illustrated in Table 1 above. For example, in step S201, when the number of peaks exceeding the predetermined determination threshold value is detected as "3," the degree-of-clouding calculation unit 36 calculates a frame score of "1," in accordance with Table 1 above. The degree-of-clouding calculation unit 36 stores the calculated frame score in a memory provided to the computer 30.

In step S203, the degree-of-clouding calculation unit 36 determines whether a headlight of an adjacent vehicle V2 is detected. In the present embodiment, detection of a light source as a candidate for a headlight of an adjacent vehicle V2 is repeatedly performed by the headlight detection unit 34, and when a light source as a candidate for a headlight of an adjacent vehicle V2 is detected as a result of detection by the headlight detection unit 34, the degree-of-clouding calculation unit 36 treats this result as detection of a headlight of an adjacent vehicle V2, and the process proceeds to step S204. When a light source as a candidate for a headlight of an adjacent vehicle V2 is not detected by the headlight detection unit 34, this result is treated as non-detection of a headlight of an adjacent vehicle V2, the process returns to step S201, and calculation of a frame score is repeated.

In step S204, the degree-of-clouding calculation unit 36 calculates the total points of the frame scores calculated within a predetermined time interval. Here, since the frame scores calculated in step S202 are stored in the memory provided to the computer 30, the degree-of-clouding calculation unit 36 can extract the frame scores calculated within the predetermined time interval from among the frame scores stored in the memory and calculate the total points of the frame scores. For example, as illustrated in FIG. 11, when a headlight of an adjacent vehicle V2 is detected and calculation of the degree of clouding of the lens is initiated, using time $t_5$ at which the headlight of the adjacent vehicle V2 was detected as a reference time, the degree-of-clouding calculation unit 36 calculates the total points of the 25-frame portion of frame scores in the 2.5 seconds from time $t_1$ 0.5 seconds before (slightly before) the reference time $t_5$ to time $t_{25}$ two seconds after the reference time $t_5$. After calculation of the degree of clouding of the lens is initiated, the total points of the 25-frame portion of frame scores in the 2.5 seconds from the time 0.5 seconds before (slightly before) the reference time to two seconds after the reference time is sequentially calculated while the reference time is offset by one cycle at a time, as illustrated in FIG. 11.

In step S205, the degree-of-clouding calculation unit 36 calculates a sensing score as illustrated in Table 2 above based on the total points of the frame scores calculated in step S204. For example, in the example illustrated in Table 2, when the total points of the frame scores is five points, a sensing score of "+1" is calculated.

In step S206, the degree-of-clouding calculation unit 36 integrates the sensing scores calculated in step S205 and calculates the integrated value of the sensing scores as the degree of clouding of the lens, as illustrated in FIG. 12. The calculated degree of clouding of the lens is used in the adjacent-vehicle detection process described hereinafter.

In the present embodiment, in view of the fact that an adjacent vehicle V2 is difficult to detect in relation to the host vehicle V1 when water scale or other foreign matter adheres to the lens and the lens is clouded, a configuration is adopted in which a headlight of the adjacent vehicle V2 is detected, and the adjacent vehicle V2 is detected based on the headlight of the adjacent vehicle V2. A configuration may be adopted in which the degree-of-clouding calculation process illustrated in FIGS. 13 and 14 is performed only under conditions in which a headlight of the adjacent vehicle V2 is on, e.g., only at night. The computational burden involved in detecting an adjacent vehicle V2 during daytime can thereby be reduced. The degree-of-clouding calculation unit 36 may assesses that it is nighttime when the overall luminance of a captured image captured by the camera 10 is equal to or less than a predetermined value, for example. The degree-of-clouding calculation unit 36 may also assess whether it is nighttime based on an illuminance meter or the time of day.

As described above, in the first embodiment, a differential waveform is generated from a differential image of a bird's-eye view image, weighting in accordance with the degree of clouding of the lens is imparted to the detection result of the first three-dimensional object detection unit 33 for detecting an adjacent vehicle V2 based on the differential waveform and to the detection result of the second three-dimensional object detection unit 35 for detecting an adjacent vehicle V2 based on a headlight, and it is assessed whether an adjacent vehicle V2 is present based on the weighted detection results. Here, when the lens is clouded, the detection result of the second three-dimensional object detection unit 35 for detecting an adjacent vehicle V2 based on a headlight tends to be more reliable than the detection result of the first three-dimensional object detection unit 33 for detecting an adjacent vehicle V2 based on a differential waveform, and when the lens is not clouded, the detection result of the first three-dimensional object detection unit 33 for detecting an adjacent vehicle V2 based on the differential waveform tends to be more reliable than the detection result of the second three-dimensional object detection unit 35 for detecting an adjacent vehicle V2 based on a headlight. It is therefore possible in the present embodiment to appropriately detect an adjacent vehicle V2 by making the weighting of the detection result of the first three-dimensional object detection unit 33 smaller and the weighting of the detection result of the second three-dimensional object detection unit 35 larger the higher the degree of clouding of the lens is, and assessing whether an adjacent vehicle V2 is present.

In the first embodiment, during calculation of the degree of clouding of the lens, the possibility of a three-dimensional object (adjacent vehicle V2) being detected is assessed to be higher the larger the number of peaks is that exceed the predetermined determination threshold value in the differential waveform, and a high frame score is calculated. The lower the total value of the frame scores calculated within a predetermined time interval is, the more difficult it is assessed to be for the lens to detect a three-dimensional object (adjacent vehicle V2), i.e., the more clouded that the lens is assessed to be, a high sensing score is calculated, and the integrated value of the sensing scores is calculated as the degree of clouding of the lens. In the present embodiment, by thus assessing whether a three-dimensional object (adjacent vehicle V2) can be detected based on a differential waveform actually generated, the degree to which the lens is clouded can be appropriately calculated as the degree of lens clouding. In particular, in the present embodiment, when a headlight of an adjacent vehicle V2 is detected, since it can be assessed that an adjacent vehicle V2 is present in the adjacent lane and a differential waveform due to the adjacent vehicle V2 can be detected, by assessing whether an adjacent vehicle V2 is present based on the differential waveform due to the adjacent vehicle V2, it is possible to assess whether the adjacent vehicle V2 cannot be detected due to clouding of the lens. The degree of clouding of the lens can thereby be appropriately calculated.

In the present embodiment, when a headlight of an adjacent vehicle V2 is detected and calculation of the degree of clouding of the lens is initiated, using the time at which the headlight of the adjacent vehicle V2 was detected as a reference time, a sensing score is calculated based on the frame scores calculated after the reference time, as illustrated in FIG. 11. The reason for this is that because the vehicle body of the adjacent vehicle V2 is usually detected behind the headlight of the adjacent vehicle V2, the differential waveform due to the adjacent vehicle V2 can be detected after the headlight of the adjacent vehicle V2 is detected, and the degree to which the adjacent vehicle V2 can be detected can be calculated as a frame score. In the present embodiment, when the headlight of the adjacent vehicle V2 is detected and calculation of the degree of clouding of the lens is initiated, the frame scores calculated slightly before the time at which the headlight of the adjacent vehicle V2 was detected are taken into account to calculate a sensing score. The reason for this is that the vehicle body of the adjacent vehicle V2 may also sometimes be detected before the headlight of the adjacent vehicle V2 is detected.

Second Embodiment

Figure 16:
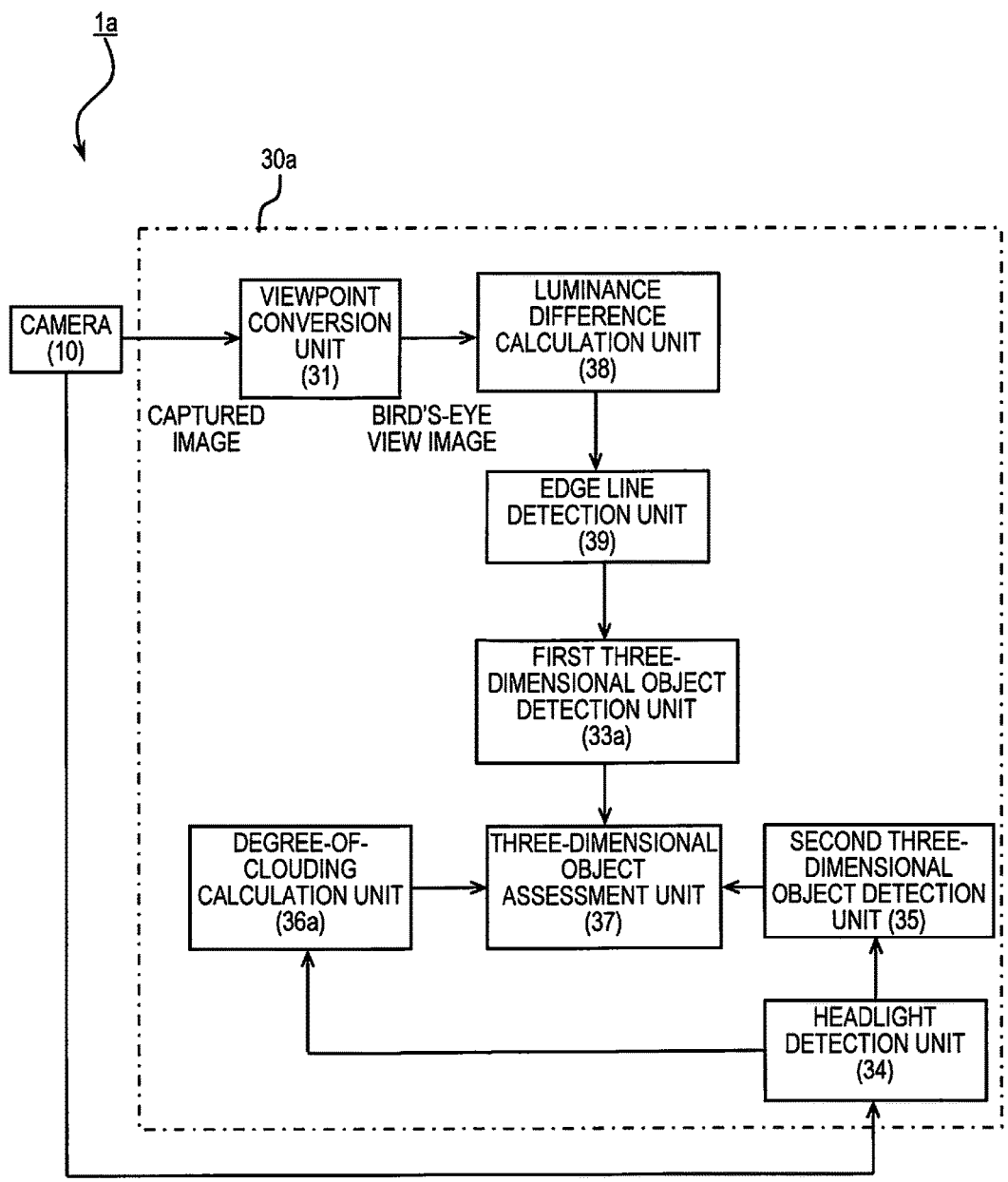
FIG. 16 is a block diagram illustrating the details of the computer according to the second embodiment.

The three-dimensional object detection device 1a according to a second embodiment will next be described. The three-dimensional object detection device 1a according to the second embodiment is the same as the first embodiment, except that a computer 30a is provided instead of the computer 30 of the first embodiment, as illustrated in FIG. 16, and the operation is as described below. Here, FIG. 16 is a block diagram illustrating the details of the computer 30a according to the second embodiment.

The three-dimensional object detection device 1a according to the second embodiment is provided with a camera 10 and a computer 30a, as illustrated in FIG. 16. The computer 30a is configured from a viewpoint conversion unit 31, a luminance difference calculation unit 38, an edge line detection unit 39, a first three-dimensional object detection unit 33a, a headlight detection unit 34, a second three-dimensional object detection unit 35, a degree-of-clouding calculation unit 36a, and a three-dimensional object assessment unit 34a. The configuration of the three-dimensional object detection device 1a according to the second embodiment is described below. The viewpoint conversion unit 31, the headlight detection unit 34, the second three-dimensional object detection unit 35, and the three-dimensional object assessment unit 37 have the same configuration as in the first embodiment and are not described below.

Figure 17:
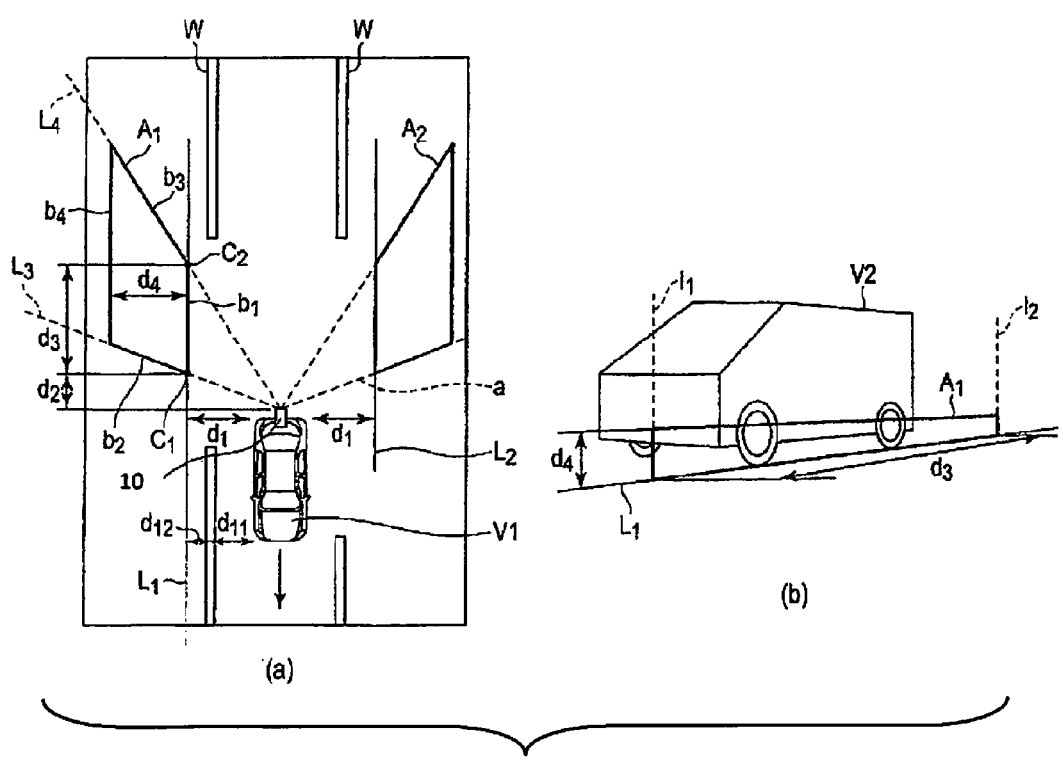
FIG. 17 is a view illustrating the traveling state of the vehicle, with part (a) of FIG. 17 being a plan view illustrating the positional relationship of the detection regions, and part (b) of FIG. 17 being a perspective view illustrating the positional relationship of the detection regions in real space.

FIG. 17 is a view illustrating the image capture range of the camera 10 in FIG. 16. Part (a) of FIG. 17 is a plan view, and part (b) of FIG. 17 is a perspective view in real space rearward from the host vehicle V1. The camera 10 is set to a predetermined view angle a, and the rearward side of the host vehicle V1 included in the predetermined view angle a is captured, as illustrated in part (a) of FIG. 17. The view angle a of the camera 10 is set so that adjacent lanes are included in the capture range of the camera 10 in addition to the lane in which the host vehicle V1 is traveling, in the same manner as illustrated in FIG. 2.

The detection regions A1, A2 in the present example are trapezoidal in a plan view (in bird's-eye view), and the position, size, and shape of the detection regions A1, A2 are decided based on distances $d_1$ to $d_4$. The detection regions A1, A2 of the example illustrated in the drawing are not limited to being trapezoidal, and may also be rectangular or another shape in bird's-eye view, as illustrated in FIG. 2.

Here, the distance d1 is the distance from the host vehicle V1 to the ground lines L1, L2. The term "ground lines L1, L2" refers to lines along which a three-dimensional object, which is present in a lane adjacent to the lane in which the host vehicle V1 is traveling, is in contact with the ground. In the present embodiment, a purpose is to detect an adjacent vehicle V2 or the like (including a two-wheeled vehicle or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the recognized position of the white line W. The distance d1 is thereby variably set using the decided distance d11. In the present embodiment described below, the position in which the adjacent vehicle V2 is traveling (the distance d12 from the white line W) and the position in which the host vehicle V1 is traveling (the distance d11 from the white line W) is roughly certain, and the distance d1 is fixedly decided.

A distance d2 is the distance extending from the rear end part of the host vehicle V1 in the vehicle progress direction. The distance d2 is decided so that the detection regions A1, A2 are accommodated within at least the view angle a of the camera 10. In the present embodiment in particular, the distance d2 is set so as to adjoin a range partitioned by the view angle a. The distance d3 indicates the length of the detection regions A1, A2 in the vehicle progress direction. The distance d3 is decided based on the size of the three-dimensional object to be detected. In the present embodiment, the object to be detected is an adjacent vehicle V2 or the like, and the distance d3 is therefore set to a length that includes the adjacent vehicle V2.

The distance d4 indicates a height which is set in real space so as to include the tires of the adjacent vehicle V2 or the like, as illustrated in part (b) of FIG. 17. In a bird's-eye view image, the distance d4 is the length illustrated in part (a) of FIG. 17. The distance d4 may also be a length that does not include lanes further adjacent to the left and right adjacent lanes in the bird's-eye view image (i.e., adjacent-adjacent lanes two lanes away). The reason for this is that when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

The distances d1 to d4 are decided as described above, and the position, size, and shape of the detection regions A1, A2 are thereby decided. More specifically, the position of the top side b1 of the detection regions A1, A2 forming a trapezoid is decided by the distance d1. The starting position C1 of the top side b1 is decided by the distance d2. The ending position C2 of the top side b1 is decided by the distance d3. The lateral side b2 of the detection regions A1, A2 forming a trapezoid is decided by a straight line L3 extending from the camera 10 toward the starting position C1. Similarly, the lateral side b3 of the detection regions A1, A2 forming a trapezoid is decided by a straight line L4 extending from the camera 10 toward the ending position C2. The position of the lower side b4 of the detection regions A1, A2 forming a trapezoid is decided by the distance d4. In this manner, the regions surrounded by the sides b1 to b4 are the detection regions A1, A2. The detection regions A1, A2 are regular squares (rectangles) in real space rearward from the host vehicle V1, as illustrated in part (b) of FIG. 17.

The luminance difference calculation unit 38 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 38 calculates, for each of a plurality of positions along a perpendicular imaginary line extending along the perpendicular direction in real space, the luminance difference between two pixels near each position. The luminance difference calculation unit 38 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. With respect to the viewpoint-converted bird's-eye view image, the luminance difference calculation unit 38 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 38 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 38 is described in detail below.

Figure 18:
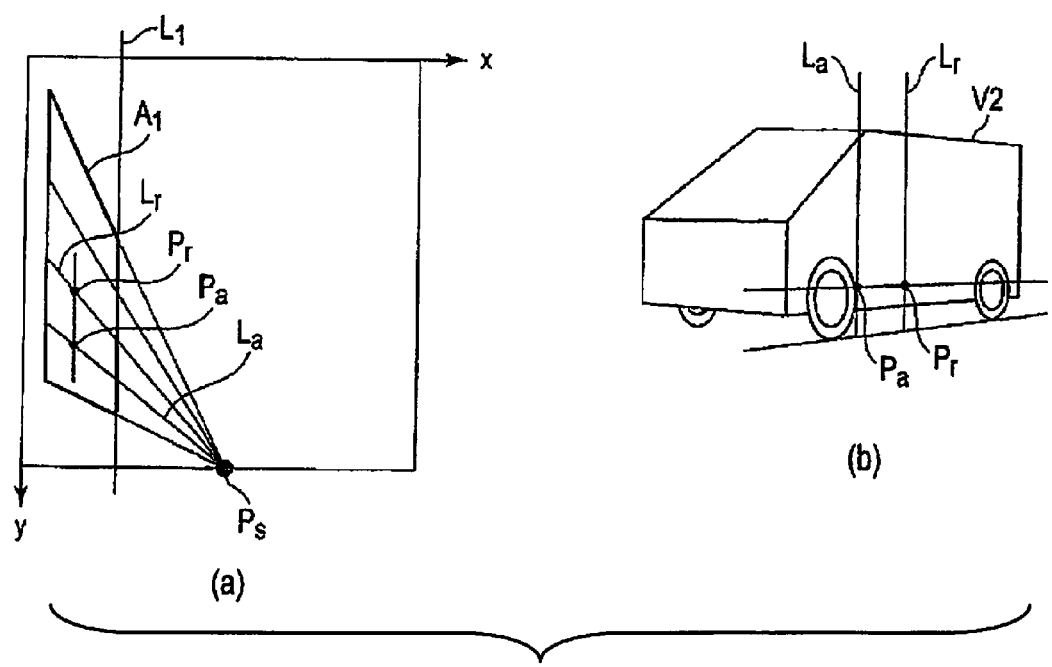
FIG. 18 is a view for describing the operation of the luminance difference calculation unit according to the second embodiment, with part (a) of FIG. 18 being a view illustrating the positional relationship of the attention lines, reference lines, attention points, and reference points in the bird's-eye-view image, and part (b) of FIG. 18 being a view illustrating the positional relationship of the attention lines, reference lines, attention points, and reference points in real space.

The luminance difference calculation unit 38 sets a first perpendicular imaginary line La (referred to hereinafter as attention line La) that corresponds to a line segment extending in the perpendicular direction in real space and that passes through the detection region A1, as illustrated in part (a) of FIG. 18. The luminance difference calculation unit 38 sets a second perpendicular imaginary line Lr (referred to hereinafter as reference line Lr) that is different from the attention line La, corresponds to the line segment extending in the perpendicular direction in real space, and passes through the detection region A1. Here, the reference line Lr is set to a position separated from the attention line La by a predetermined distance in real space. The lines that correspond to the line segments extending in the perpendicular direction in real space are lines that spread out radially from the position Ps of the camera 10 in a bird's-eye view image. These radially spreading are lines that follow the collapsing direction of the three-dimensional object when converted to a bird's-eye view.

The luminance difference calculation unit 38 sets an attention point Pa on the attention line La (a point on the first perpendicular imaginary line). The luminance difference calculation unit 38 sets a reference point Pr on the reference line Lr (a point on the second perpendicular imaginary line). The attention line La, the attention point Pa, the reference line Lr, and the reference point Pr have the relationship in real space illustrated in part (b) of FIG. 18. It is apparent from part (b) of FIG. 18 that the attention line La and the reference line Lr are lines extending in the perpendicular direction in real space, and that the attention point Pa and the reference point Pr are points set to substantially the same height in real space. The attention point Pa and the reference point Pr are not necessarily required to be kept strictly at the same height, and a certain amount of error that allows for the attention point Pa and the reference point Pr to be deemed to be at the same height is allowed.

The luminance difference calculation unit 38 determines the luminance difference between the attention point Pa and the reference point Pr. If the luminance difference between the attention point Pa and the reference point Pr is large, it is possible that an edge is present between the attention point Pa and the reference point Pr. In particular, since a perpendicular imaginary line is set as a line segment extending in the perpendicular direction in real space in relation to the bird's-eye view image in order to detect a three-dimensional object present in the detection regions A1, A2, it is highly probable that there is an edge of a three-dimensional object in the location where the attention line La has been set when the luminance difference between the attention line La and the reference line Lr is high. Accordingly, the edge line detection unit 39 illustrated in FIG. 16 detects an edge line based on the luminance difference between the attention point Pa and the reference point Pr.

Figure 19:
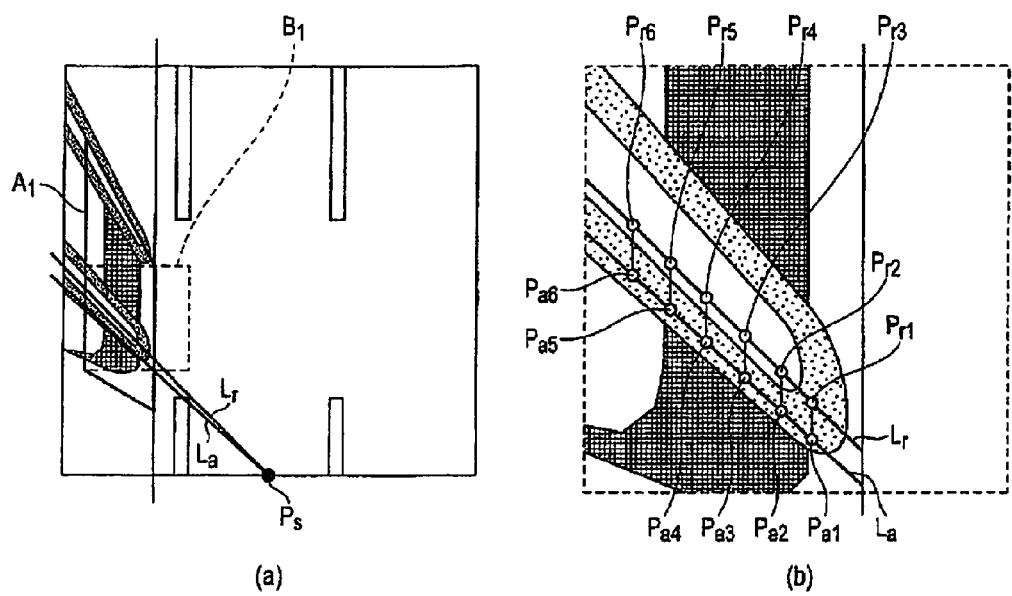
FIG. 19 is a view for describing the detailed operation of the luminance difference calculation unit according to the second embodiment, with part (a) of FIG. 19 being a view illustrating the detection region in the bird's-eye-view image, and part (b) of FIG. 19 being a view illustrating the positional relationship of the attention lines, reference lines, attention points, and reference points in the bird's-eye-view image.

This point will be described in greater detail. FIG. 19 is a view for describing the detailed operation of the luminance difference calculation unit 38. Part (a) of FIG. 19 illustrates a bird's-eye view image of the bird's-eye view state, and part (b) of FIG. 19 is an enlarged view of the bird's-eye view image illustrated in part (a) of FIG. 19. In FIG. 19, only the detection region A1 is illustrated and described, but the luminance difference is calculated using the same procedure for detection region A2.

When the adjacent vehicle V2 is being displayed in the captured image captured by the camera 10, the adjacent vehicle V2 appears in the detection region A1 in the bird's-eye view image, as illustrated in part (a) of FIG. 19. The attention line La is set on a rubber portion of a tire of the adjacent vehicle V2 in the bird's-eye view image in part (b) of FIG. 19, as illustrated in the enlarged view of region B1 in part (a) of FIG. 19. In this state, the luminance difference calculation unit 38 first sets the reference line Lr. The reference line Lr is set along the perpendicular direction in a position separated a predetermined distance from the attention line La in real space. Specifically, in the three-dimensional object detection device 1a according to the present embodiment, the reference line Lr is set in a position separated 10 cm from the attention line La in real space. The reference line Lr is thereby set on the wheel of the tire of the adjacent vehicle V2 so as to be separated a distance corresponding to 10 cm from the rubber of the tire of the adjacent vehicle V2, for example, in the bird's-eye view image.

Next, the luminance difference calculation unit 38 sets a plurality of attention points Pa1 to PaN on the attention line La. In part (b) of FIG. 19, six attention points Pa1 to Pa6 (referred to hereinafter as attention point Pai when indicating an arbitrary point) are set for convenience of description. An arbitrary number of attention points Pa may be set on the attention line La. In the description below, N attention points Pa are set on the attention line La.

The luminance difference calculation unit 38 then sets the reference points Pr1 to PrN so as to have the same height as the attention points Pa1 to PaN in real space. The luminance difference calculation unit 38 calculates the luminance difference between attention point Pa and reference point Pr pairs at the same height. The luminance difference calculation unit 35 thereby calculates the luminance difference between two pixels for each of the plurality of positions (1 to N) along the perpendicular imaginary line extending in the perpendicular direction in real space. The luminance difference calculation unit 38 calculates the luminance difference between, e.g., a first attention point Pa1 and a first reference point Pr1, and calculates the luminance difference between a second attention point Pa2 and a second reference point Pr2. The luminance difference calculation unit 38 thereby determines the luminance difference in continuous fashion along the attention line La and the reference line Lr. In other words, the luminance difference calculation unit 38 sequentially determines the luminance difference between the third to $N^{th}$ attention points Pa3 to PaN and the third to $N^{th}$ reference points Pr3 to PrN.

The luminance difference calculation unit 38 repeatedly executes the process of setting the above-described reference line Lr, setting the attention point Pa, setting the reference point Pr, and calculating the luminance difference while offsetting the attention line La within the detection region A1. In other words, the luminance difference calculation unit 38 repeatedly executes the above-described process while changing the positions of the attention line La and the reference line Lr by the same distance in real space along the direction in which the ground line L1 extends. The luminance difference calculation unit 38, sets the line that was the reference line Lr in the previous process to be the attention line La, sets the reference line Lr in relation to the attention line La, and sequentially determines the luminance difference, for example.

In this manner, determining the luminance difference from the attention point Pa on the attention line La and the reference point Pr on the reference line Lr, which are at substantially the same height in real space, allows the luminance difference to be clearly detected when an edge extending in the perpendicular direction is present. The precision of detecting a three-dimensional object can be enhanced without the process for detecting the three-dimensional object being affected, even when the three-dimensional object is stretched in accordance with the height from the road surface by conversion to a bird's-eye view image in order to compare the luminance between the perpendicular imaginary lines extending in the perpendicular direction in real space.

Returning to FIG. 16, the edge line detection unit 39 detects the edge line from the continuous luminance difference calculated by the luminance difference calculation unit 38. For example, in the case illustrated in part (b) of FIG. 19, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Consequently, the luminance difference between the second to sixth attention points Pa2 to Pa6 and the second to sixth reference points Pr2 to Pr6 is large. Accordingly, the edge line detection unit 39 is capable of detecting that an edge is present between the second to sixth attention points Pa2 to Pa6 and the second to sixth reference points Pr2 to Pr6 where the luminance difference is large.

Specifically, when an edge line is to be detected, the edge line detection unit 39 first assigns an attribute to the $i^{th}$ attention point Pai from the luminance difference between the $i^{th}$ attention point Pai (coordinates (xi, yi)) and the $i^{th}$ reference point Pri (coordinates (xi', yi')) in accordance with Formula 2 noted below.

When $I(xi,yi) > I(xi',yi') + t$, $s(xi,yi) = 1$, and when $I(xi,yi) < I(xi',yi') - t$, $s(xi,yi) = -1$.

Otherwise, $s(xi,yi) = 0$. Formula 2

In Formula 2 above, t represents an edge threshold value, I(xi, yi) represents the luminance value of the $i^{th}$ attention point Pai, and I(xi', yi') represents the luminance value of the $i^{th}$ reference point Pri. According to Formula 2, the attribute s(xi, yi) of the attention point Pai is '1' when the luminance value of the attention point Pai is higher than the luminance value obtained by adding the edge threshold value t to the reference point Pri. On the other hand, the attribute s(xi, yi) of the attention point Pai is '−1' when the luminance value of the attention point Pai is less than the luminance value obtained by subtracting the edge threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 39 determines whether the attention line La is an edge line from the continuity c(xi, yi) of the attribute s along the attention line La based on Formula 3 below.

When $s(xi,yi) = s(xi+1,yi+1)$ (except when $0=0$), $c(xi,yi) = 1$.

Otherwise, $c(xi,yi) = 0$. Formula 3

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 39 determines the sum of the continuities c of all the attention points Pa on the attention line La. The edge line detection unit 39 normalizes the continuity c by dividing the sum of the continuities c thus determined by the number N of attention points Pa. The edge line detection unit 39 assesses that the attention line La is an edge line when the normalized value exceeds a threshold value θ. The threshold value θ is set in advance by experimentation or other means.

In other words, the edge line detection unit 39 assesses whether the attention line La is an edge line based on Formula 4 below. The edge line detection unit 39 then assesses whether all of the attention lines La drawn on the detection region A1 are edge lines.

$\Sigma c(xi,yi)/N > \theta$ Formula 4

Figure 20:
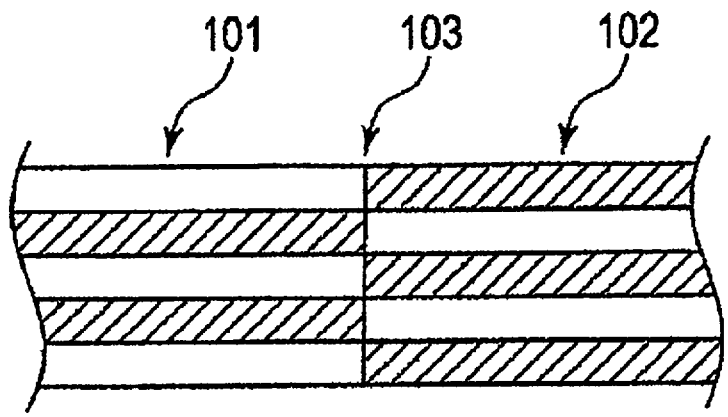
FIG. 20 is a view illustrating an image example for describing the edge detection operation.

In this manner, in the second embodiment, an attribute is assigned to the attention point Pa based on the luminance difference between the attention point Pa on the attention line La and the reference point Pr on the reference line Lr, and it is assessed whether the attention line La is an edge line based on the continuity c of the attributes along the attention line La. Therefore, the boundaries between regions having high luminance and regions having low luminance are detected as edge lines, and edge detection that is in accordance with the natural senses of a human can be performed. The results of the above will be described in detail. FIG. 20 is a view illustrating an image example for describing the processing performed by the edge line detection unit 39. This image example is an image in which a first stripe pattern 101 and a second stripe pattern 102 are adjacent to each other, the first stripe pattern 101 indicating a stripe pattern in which regions of high luminance and regions of low luminance are repeated, and the second stripe pattern 102 indicating a stripe pattern in which regions of low luminance and regions of high luminance are repeated. Also, in this image example, regions of the first stripe pattern 101 in which the luminance is high, and regions of the second stripe pattern 102 in which the luminance is low are adjacent to each other, and regions of the first stripe pattern 101 in which the luminance is low, and regions of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the regions of low luminance and the regions of high luminance are adjacent to each other, the location 103 is recognized as an edge when an edge is detected only by luminance difference. However, the edge line detection unit 39 determines the location 103 to be an edge line only when there is continuity in the attributes of the luminance difference, in addition to using the luminance difference at the location 103. Therefore, the edge line detection unit 39 is capable of suppressing erroneous determination in which the location 103, which is not recognized as an edge line by human senses, is recognized as an edge line, and edge detection that is in accordance with human senses can be performed.

Returning to FIG. 16, the first three-dimensional object detection unit 33a detects a three-dimensional object based on the quantity of edge lines detected by the edge line detection unit 39. As described above, the three-dimensional object detection device 1a according to the present embodiment detects an edge line extending in the perpendicular direction in real space. Detection of numerous edge lines extending in the perpendicular direction indicates that it is highly probable that a three-dimensional object is present in the detection regions A1, A2. Accordingly, the first three-dimensional object detection unit 33a detects a three-dimensional object based on the quantity of edge lines detected by the edge line detection unit 39. Specifically, the first three-dimensional object detection unit 33a assesses whether the quantity of edge lines detected by the edge line detection unit 39 is equal to or greater than a predetermined threshold value β, and when the quantity of edge lines is equal to or greater than a predetermined threshold value β, the edge lines detected by the edge line detection unit 39 are assessed to be the edge lines of a three-dimensional object.

Furthermore, prior to detecting the three-dimensional object, the first three-dimensional object detection unit 33a determines whether the edge lines detected by the edge line detection unit 39 are correct. The first three-dimensional object detection unit 33a determines whether a change in luminance on the edge lines is equal to or greater than a predetermined threshold value tb along the edge lines of the bird's-eye view image. When the change in luminance on the edge lines in the bird's-eye view image is equal to or greater than a predetermined threshold value tb, the edge lines are assessed to have been detected by erroneous determination. On the other hand, when the change in luminance on the edge lines in the bird's-eye view image is less than a predetermined threshold value tb, it is determined that the edge lines are correct. The threshold value tb is set in advance by experimentation or other means.

Figure 21:
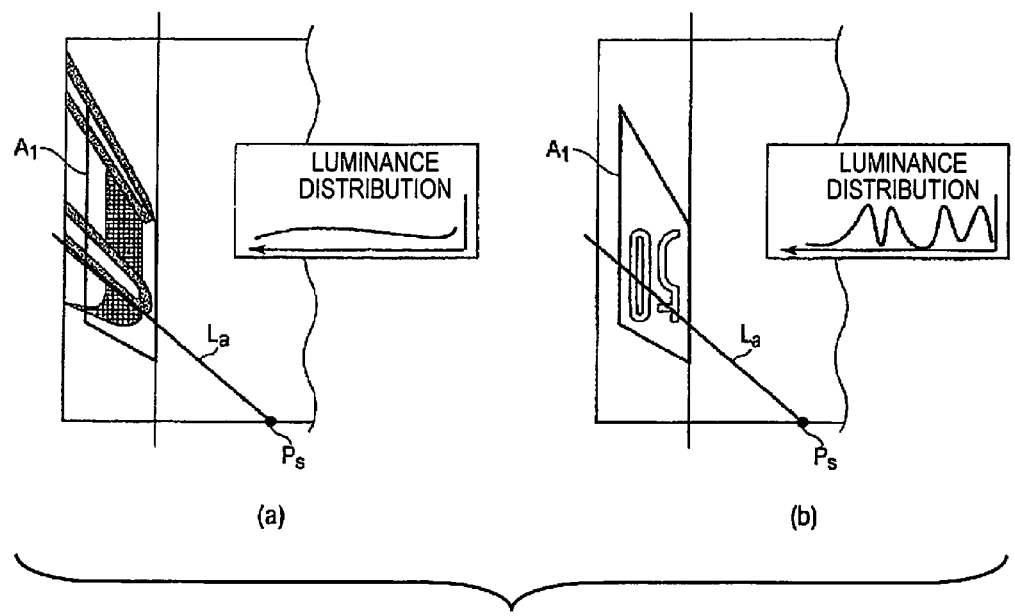
FIG. 21 is a view illustrating an edge line and the luminance distribution on the edge line, with part (a) of FIG. 21 being a view illustrating the luminance distribution when a three-dimensional object (adjacent vehicle) is present in the detection region, and part (b) of FIG. 21 being a view illustrating the luminance distribution when a three-dimensional object is not present in the detection region.

FIG. 21 is a view illustrating the luminance distribution on the edge line. Part (a) of FIG. 21 illustrates the edge line and the luminance distribution when an adjacent vehicle V2 as a three-dimensional object is present in the detection region A1, and part (b) of FIG. 21 illustrates the edge line and the luminance distribution when a three-dimensional object is not present in the detection region A1.

As illustrated in part (a) of FIG. 21, it is assumed that it has been assessed that the attention line La set on the tire rubber portion of the adjacent vehicle V2 is an edge line in the bird's-eye view image. In this case, the change in luminance on the attention line La in the bird's-eye view image is gradual. This is due to the tire of the adjacent vehicle having been enlarged within the bird's-eye view image due to viewpoint conversion of the image captured by the camera 10 to a bird's-eye view image. On the other hand, the attention line La set in the white character portion "50" drawn on the road surface in the bird's-eye view image is assumed to have been erroneously determined to be an edge line, as illustrated in part (b) of FIG. 21. In this case, the change in luminance on the attention line La in the bird's-eye view image has large undulations. This is because the road and other portions of low luminance are mixed with the portions of high luminance in the white characters on the edge line.

The screw part first three-dimensional object detection unit 33a determines whether an edge line has been detected by erroneous determination based on differences in the luminance distribution on the attention line La as described above. For example, when the captured image acquired by the camera 10 is converted to a bird's-eye view image, a three-dimensional object included in a captured image tends to appear stretched in a bird's-eye view image. As described above, when the tire of an adjacent vehicle V2 is stretched, the tire as a single location is stretched, and changes in luminance of the bird's-eye view image in the direction of stretching tend to be small. In contrast, when a character or the like drawn on the road surface has been erroneously determined to be an edge line, regions of high luminance such as the character portion and regions of low luminance such as the road surface portion are included in intermixed fashion in the bird's-eye view image. In this case, changes in luminance in the direction of stretching tend to be greater. Accordingly, the first three-dimensional object detection unit 33a assesses that the edge line has been detected by erroneous determination and that the edge line is not caused by a three-dimensional object when the change in luminance along the edge line is equal to or greater than a predetermined threshold value tb. It is thereby possible to suppress determination of white characters such as "50" on the road surface, roadside vegetation, and the like as edge lines, and to suppress a reduction in the precision of detecting a three-dimensional object. On the other hand, the first three-dimensional object detection unit 33a determines that an edge line is the edge line of a three-dimensional object and that a three-dimensional object is present when changes in luminance along the edge line are less than a predetermined threshold value tb.

Specifically, the first three-dimensional object detection unit 33a calculates the change in luminance of the edge line using Formula 5 or 6 below. The change in luminance of the edge line corresponds to an evaluation value in the perpendicular direction in real space. Formula 5 evaluates the luminance distribution using the total value of the square of the difference between the $i^{th}$ luminance value I(xi, yi) and the adjacent $(i+1)^{th}$ luminance value I(xi+1, yi+1) on the attention line La. Formula 6 evaluates the luminance distribution using the total value of the absolute value of the difference between the $i^{th}$ luminance value I(xi, yi) and the adjacent $(i+1)^{th}$ luminance value I(xi+1, yi+1) on the attention line La.

Evaluation value in direction corresponding to perpendicular=Σ[{I(xi,yi)−I(xi+1,yi+1)}$^2$]    Formula 5

Evaluation value in direction corresponding to perpendicular=Σ|I(xi,yi)−I(xi+1,yi+1)|    Formula 6

The use of Formula 6 is not limiting, and it is also possible to binarize an attribute b of an adjacent luminance value using a threshold value t2, and then sum the binarized attribute b for all of the attention points Pa, as in Formula 7 below.

Evaluation value in direction corresponding to perpendicular=Σb(xi,yi)

where b(xi,yi)=1 when |I(xi,yi)−I(xi+1,yi+1)|>t2.

Otherwise, b(xi,yi)=0.    Formula 7

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not determined to be on the same three-dimensional object. The first three-dimensional object detection unit 33a then sums the attribute b for all of the attention points Pa on the attention line La and determines the evaluation value in the perpendicular equivalent direction to thereby determine whether an edge line is caused by a three-dimensional object and a three-dimensional object is present.

The degree-of-clouding calculation unit 36a according to the second embodiment calculates a frame score for each frame based on the number of edge lines detected from each bird's-eye view image obtained at a predetermined cycle (frame rate). For example, when the number of detected edge lines is 0 to 2, the degree-of-clouding calculation unit 36a assesses that an adjacent vehicle V2 is not detected and calculates a score of 0 points, and when the number of detected edge lines is 3 to 4, the degree-of-clouding calculation unit 36a assesses that an adjacent vehicle V2 may possibly be detected, and calculates a score of 1 point, as illustrated in Table 3 below. When the number of edge lines is 5 to 6, the degree-of-clouding calculation unit 36a assesses that it is highly probable that an adjacent vehicle V2 is detected, and calculates a score of 2 points, and when the number of detected edge lines is 7 or more, the degree-of-clouding calculation unit 36a assesses that it is even more probable that an adjacent vehicle V2 is detected, and calculates a score of 3 points.

TABLE 3

| Number of edge lines | 0 to 2 | 3 to 4 | 5 to 6 | 7 or more |
|---|---|---|---|---|
| Frame score | 0 points | 1 point | 2 points | 3 points |

The degree-of-clouding calculation unit 36a calculates a sensing score based on the frame scores calculated within a predetermined time and integrates the calculated sensing scores, and thereby calculates the integrated value of the sensing scores as the degree of clouding of the lens. The sensing score and the degree of clouding of the lens may be calculated by the same method as in the first embodiment.

Figure 22:
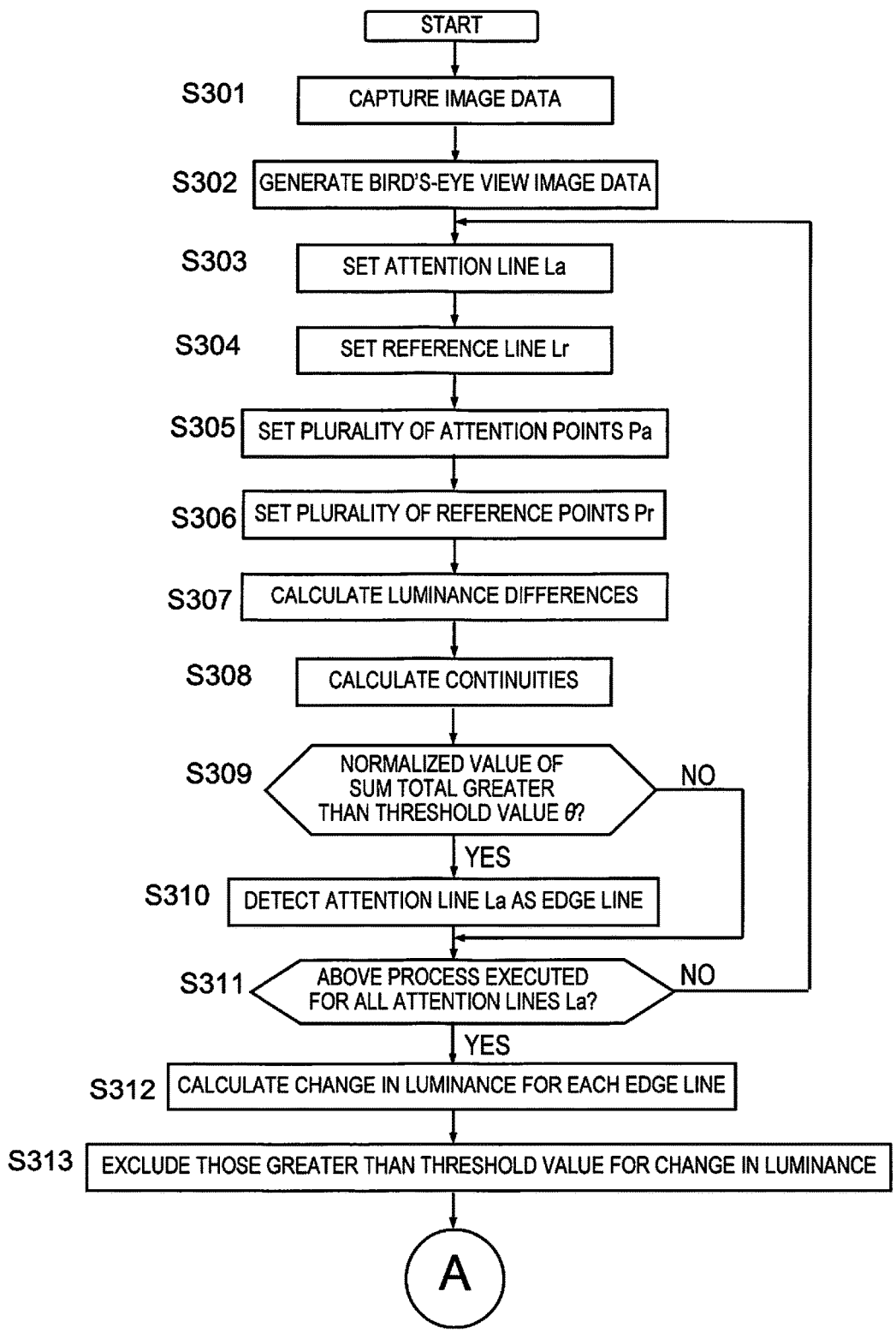
FIG. 22 is a first part of a flowchart illustrating the adjacent-vehicle detection process according to the second embodiment.
Figure 23:
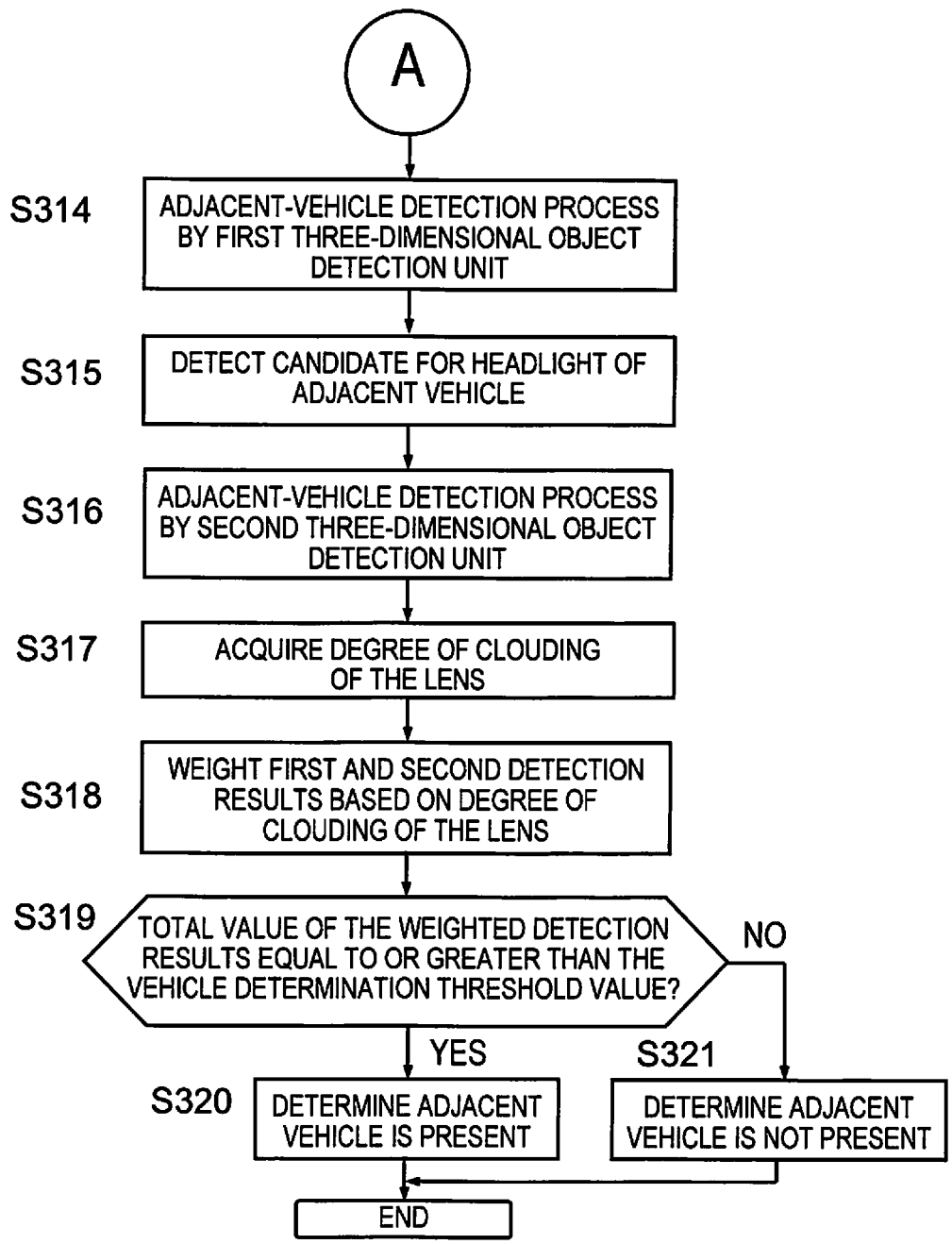
FIG. 23 is a second part of a flowchart illustrating the adjacent-vehicle detection process according to the second embodiment.

The adjacent-vehicle detection method according to the second embodiment will next be described with reference to FIGS. 22 and 23. FIGS. 22 and 23 are flowcharts illustrating the details of the adjacent-vehicle detection method according to the second embodiment. In the present embodiment, the adjacent-vehicle detection process is executed in parallel with the degree-of-clouding calculation process described hereinafter. The adjacent-vehicle detection process of the present embodiment is repeatedly performed at a predetermined cycle (e.g., a 0.1-second cycle). For the sake of convenience, processing performed for the detection region A1 is described below, but the same processing is performed for the detection region A2.

In step S301, a predetermined region specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates bird's-eye view image data in step S302.

Next, in step S303, the luminance difference calculation unit 38 sets the attention line La on the detection region A1. At this time, the luminance difference calculation unit 38 sets a line corresponding to a line extending in the perpendicular direction in real space as the attention line La. The luminance difference calculation unit 38 then sets the reference line Lr on the detection region A1 in step S304. At this time, the luminance difference calculation unit 38 sets, as the reference line Lr, a line that corresponds to a line extending in the perpendicular direction in real space and that is separated by a predetermined distance in real space from the attention line La.

Next, in step S305, the luminance difference calculation unit 38 sets a plurality of attention points Pa on the attention line La. The luminance difference calculation unit 38 at this time sets a number of attention points Pa that will not be problematic during edge detection by the edge line detection unit 39. In step S306, the luminance difference calculation unit 38 sets reference points Pr so that the attention points Pa and the reference points Pr are at substantially the same height in real space. The attention points Pa and the reference points Pr thereby line up in a substantially horizontal direction, and the edge line extending in the perpendicular direction in real space is more readily detected.

Next, in step S307, the luminance difference calculation unit 38 calculates the luminance difference between the attention points Pa and the reference points Pr at the same height in real space. The edge line detection unit 39 calculates the attribute s of the attention points Pa in accordance with Formula 1 described above, based on the luminance difference calculated by the luminance difference calculation unit 38.

In step S308, the edge line detection unit 39 then calculates the continuity c of the attribute s of the attention points Pa in accordance with Formula 2. In step S309, the edge line detection unit 39 furthermore determines whether the value obtained by normalizing the sum of the continuity c is greater than a threshold value $\theta$, in accordance with Formula 3. When it has been assessed that the normalized value is greater than the threshold value $\theta$ (step S309=Yes), the edge line detection unit 39 detects the attention line La as the edge line in step S310. The process then transitions to step S311. When it has been assessed that the normalized value is not greater than the threshold value $\theta$ (step S309=No), the edge line detection unit 39 does not detect that the attention line La is an edge line, and the process transitions to step S311.

In step S311, the computer 30a assesses whether the processes of steps S303 to S310 have been executed for all the attention lines La that can be set on the detection region A1. When it is assessed that the above processes have not been carried out for all the attention lines La (step S311=No), the process returns to step S303, a new attention line La is set, and the process through step S311 is repeated. On the other hand, when it is assessed that the processes have been carried out for all the attention lines La (step S311=Yes), the process proceeds to step S312.

In step S312, the first three-dimensional object detection unit 33a calculates the change in luminance along the edge line for each edge line detected in step S310. The first three-dimensional object detection unit 33a calculates the change in luminance of edge lines in accordance with any of formulas 5, 6, and 7. Next, in step S313, the first three-dimensional object detection unit 33a excludes, from among the edge lines, edge lines in which the change in luminance is equal to or greater than a predetermined threshold value tb. In other words, when it is determined that an edge line having a large change in luminance is not a correct edge line, the edge line is not used for detecting a three-dimensional object. As described above, this is done in order to suppress the detection of characters on the road surface, roadside vegetation, and the like included in the detection region A1 as edge lines. Consequently, the predetermined threshold value tb is determined by experimentation or other means in advance, and is set based on the change in luminance that occurs due to characters on the road surface, roadside vegetation, and the like. On the other hand, the first three-dimensional object detection unit 33a assesses an edge line having a change in luminance that is less than a predetermined threshold value tb to be an edge line of a three-dimensional object, and thereby detects the three-dimensional object present in an adjacent lane.

Next, in step S314, the first three-dimensional object detection unit 33a detects an adjacent vehicle V2. Specifically, the first three-dimensional object detection unit 33a assesses whether an adjacent vehicle V2 is present in an adjacent lane by assessing whether the quantity of edge lines detected in step S310 is equal to or greater than a predetermined threshold value Here, the threshold value $\beta$ is determined in advance by experimentation or other means and set. For example, when a four-wheeled vehicle is set as the three-dimensional object to be detected, the threshold value β is set in advance by experimentation or other means based on the number of edge lines of a four-wheeled vehicle that appears in the detection region A1. When the quantity of edge lines is equal to or greater than the threshold value the first three-dimensional object detection unit 33a assesses that an adjacent vehicle V2 is present in the detection region A1 and detects an adjacent vehicle V2 in the adjacent lane. On the other hand, when the quantity of edge lines is not equal to or greater than the threshold value A the first three-dimensional object detection unit 33a assesses that an adjacent vehicle V2 is not present in the detection region A1, and does not detect an adjacent vehicle V2.

As in steps S112 to S114 of the first embodiment, in steps S315 to S317, a light source as a candidate for a headlight of an adjacent vehicle V2 is detected (step S315), and an adjacent vehicle V2 is detected (step S316) by the second three-dimensional object detection unit 35 based on the detected light source which is a candidate for a headlight of the adjacent vehicle V2. The degree of lens clouding calculated by the degree-of-clouding calculation process described hereinafter is then acquired (step S317).

In step S318, the detection result of the first three-dimensional object detection unit 33a obtained in step S314 and the detection result of the second three-dimensional object detection unit 35 obtained in step S316 are weighted by the three-dimensional object assessment unit 37 based on the degree of lens clouding acquired in step S317. Specifically, the three-dimensional object assessment unit 37 makes the weighting $W_{c1}$ of the detection result of the first three-dimensional object detection unit 33a smaller and the weighting $W_{c2}$ of the detection result of the second three-dimensional object detection unit 35 larger the higher the degree of lens clouding is, as illustrated by Formula 1.

Next, in step S319, the three-dimensional object assessment unit 37 assesses whether the total value of the detection results weighted in step S318 exceeds the predetermined vehicle determination threshold value $s_c$, as illustrated by Formula 1, and when the total value of the weighted detection result of the first three-dimensional object detection unit 33a and detection result of the second three-dimensional object detection unit 35 exceeds the predetermined vehicle determination threshold value $s_c$, the process proceeds to step S320, and it is assessed that an adjacent vehicle V2 is present. When the total value does not exceed the predetermined vehicle determination threshold value $s_c$, the process proceeds to step S321, and it is assessed that an adjacent vehicle V2 is not present.

Figure 24:
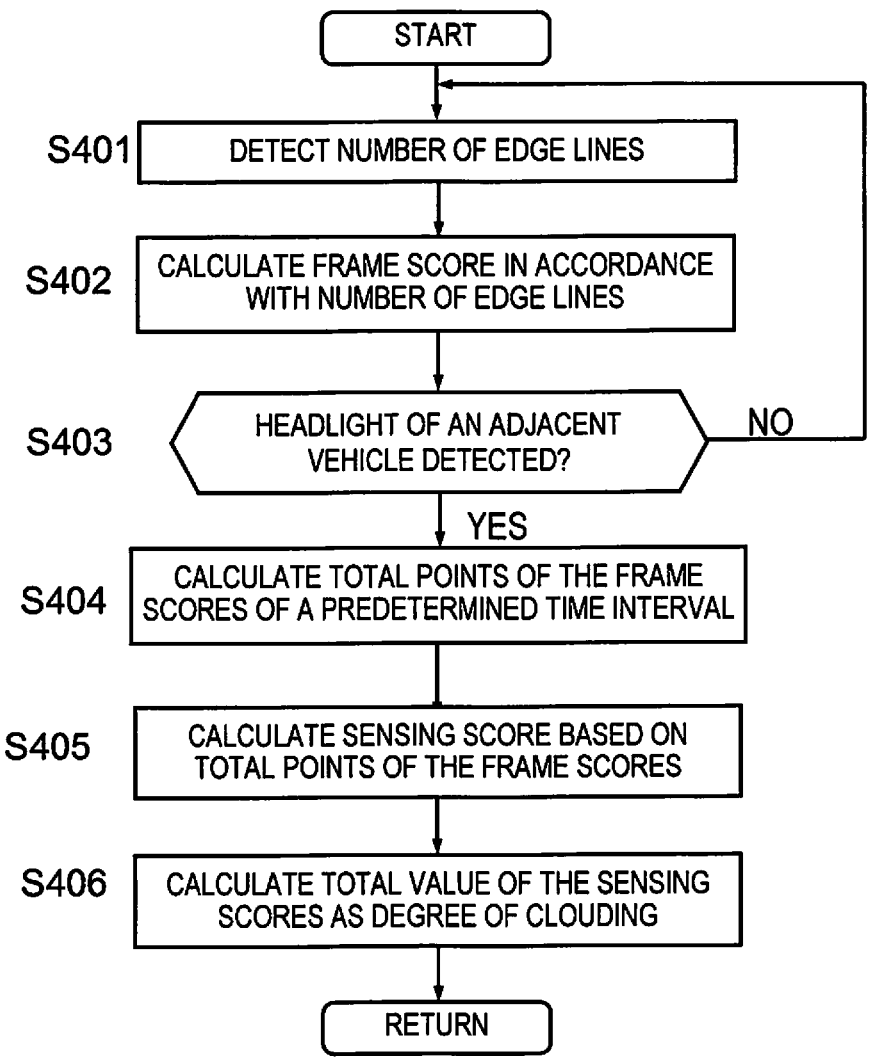
FIG. 24 is a flowchart illustrating the degree-of-clouding calculation process according to the second embodiment.

The degree-of-clouding calculation process according to the second embodiment will next be described with reference to FIG. 24. FIG. 24 is a flowchart illustrating the degree-of-clouding calculation process according to the second embodiment. The degree-of-clouding calculation process described below is executed at a predetermined cycle (e.g., a 0.1-second cycle). The degree-of-clouding calculation process described below is performed in parallel with the adjacent-vehicle detection process described above, and the degree of clouding of the lens calculated in this degree-of-clouding calculation process is used during detection of an adjacent vehicle V2 in the adjacent-vehicle detection process described above.

In step S401, the degree-of-clouding calculation unit 36 detects the number of edge lines detected in the adjacent-vehicle detection process described above. In step S402, a frame score is calculated based on the number of edge lines detected in step S401, as illustrated in Table 1 above.

The same process as in steps S203 to S206 of the first embodiment is performed in steps S403 to S406. In other words, a determination is made as to whether a headlight of an adjacent vehicle V2 is detected (step S403), and when a headlight of an adjacent vehicle V2 is detected (step S403=Yes), the total points of the frame scores calculated within a predetermined time interval is calculated (step S404). A sensing score is then calculated (step S405) as illustrated in Table 2 above based on the total points of the calculated frame scores, and the integrated value of the sensing score is calculated as the degree of clouding of the lens (step S406). When a headlight of an adjacent vehicle V2 is not detected (step S403=No), calculation of a frame score is repeated. The degree of clouding of the lens calculated in step S406 is used in the adjacent-vehicle detection process illustrated in FIGS. 22 and 23.

As described above, in the second embodiment, an edge of an adjacent vehicle V2 is detected, a weighting corresponding to the degree of clouding of the lens is applied to the detection result of the first three-dimensional object detection unit 33a for detecting an adjacent vehicle V2 based on the edge, and to the detection result of the second three-dimensional object detection unit 35 for detecting an adjacent vehicle V2 based on a headlight, and an assessment is made based on the weighted detection results as to whether an adjacent vehicle V2 is present. Specifically, the weighting of the detection result of the first three-dimensional object detection unit 33 is made smaller and the weighting of the detection result of the second three-dimensional object detection unit 35 is made larger the higher the degree of clouding of the lens is, and it is assessed whether an adjacent vehicle V2 is present. In addition to the effect of the first embodiment, it is thereby possible in the second embodiment to appropriately detect an adjacent vehicle V2 in accordance with the degree to which the lens is clouded also when the adjacent vehicle V2 is detected based on an edge detected from the captured image.

The embodiments described above are described in order to facilitate understanding of the present invention, and are not described in order to limit the present invention. Consequently, the elements disclosed in the embodiments above are intended to include all design modifications and equivalents thereto that lie within the technical range of the present invention.

For example, in the embodiments described above, an example configuration was described in which the detection result of the first three-dimensional object detection unit 33 and the detection result of the second three-dimensional object detection unit 35 are weighted based on the degree of clouding of the lens, as illustrated in Formula 1, and an adjacent vehicle V2 is assessed to be present when the total value of the weighted detection result of the first three-dimensional object detection unit 33 and detection result of the second three-dimensional object detection unit 35 is equal to or greater than a predetermined vehicle determination threshold value $s_c$. However, this configuration is not limiting, and a configuration may be adopted in which the difference threshold value th and the edge threshold value t for detecting a three-dimensional object are changed based on the degree of clouding of the lens, for example. Specifically, the difference threshold value th or the edge threshold value t may be changed to a lower value the higher the degree of clouding of the lens is in order to facilitate detection of a three-dimensional object. In this case, a three-dimensional object can easily be detected even when the lens is clouded, and an adjacent vehicle V2 present in an adjacent lane can therefore be appropriately detected. Similarly, the threshold value α and threshold value β for detecting a three-dimensional object may be made lower the higher the degree of clouding of the lens is. The threshold value θ, the threshold value t2, the threshold value tb, and other values may also be changed the higher the degree of clouding of the lens is, in order to facilitate detection of a three-dimensional object. The pixel values (or luminance values) outputted from the camera 10 may also be increased the higher the detected degree of clouding of the lens is. In this case, since difference pixels DP or edges become easier to detect, detection of a three-dimensional object (adjacent vehicle V2) is accelerated, and as a result, an adjacent vehicle V2 can be appropriately detected even when the lens is clouded.

In the first embodiment described above, an example configuration is described in which a three-dimensional object is detected as an adjacent vehicle V2 when the traveling speed of the three-dimensional object satisfies a predetermined condition. However, a configuration may be adopted in which detection of an adjacent vehicle V2 is accelerated by relaxing the abovementioned condition when the degree of clouding of the lens is high, for example. In the embodiments described above, a three-dimensional object is assessed to be an adjacent vehicle V2 when the absolute traveling speed of the three-dimensional object is 10 km/h or greater and the relative traveling speed of the three-dimensional object with respect to the host vehicle V1 is +60 km/h or less, for example. However, a configuration may be adopted in which a three-dimensional object is assessed to be an adjacent vehicle V2 when the absolute traveling speed of the three-dimensional object is 5 km/h or greater and the relative traveling speed of the three-dimensional object with respect to the host vehicle V1 is +70 km/h or less, for example, when the degree of clouding of the lens is high.

In addition to the embodiments described above, a configuration may be adopted in which it is assumed that the lens is clouded and an adjacent vehicle V2 cannot appropriately be detected when the degree of clouding of the lens is equal to or greater than a predetermined value, and detection of an adjacent vehicle V2 is not performed in such a case. For example, in the example illustrated in FIG. 12, a configuration may also be adopted in which detection of an adjacent vehicle V2 is not performed when the degree of clouding of the lens has reached an upper-limit value $S_2$ of 100, or when the degree of clouding of the lens is near the upper-limit value $S_2$, i.e., 80 or higher.

In the embodiments described above, an example configuration was described in which a sensing score is calculated based on frame scores calculated within a predetermined time interval including a light amount of time prior to the time that a headlight of an adjacent vehicle V2 was detected, when a headlight of an adjacent vehicle V2 is detected and calculation of the degree of lens clouding is initiated. However, this configuration is not limiting, and a configuration may be adopted in which a sensing score is calculated based on only the frame scores calculated within a predetermined time interval after the headlight of the adjacent vehicle V2 was detected, for example. For example, in the example illustrated in FIG. 11, a configuration may be adopted in which the sensing score $DS_1$ is calculated by calculating a sensing score based on a 25-frame portion of frame scores from time $t_5$ at which the headlight of the adjacent vehicle V2 was detected until time $t_{30}$.

Moreover, in the embodiments described above, an example is described of a case in which water scale or other foreign matter adheres to the lens of the camera 10, and the lens is clouded. However, the foreign matter is not limited to water scale, and may also include raindrops, mud, or the like.

The camera 10 of the embodiments described above corresponds to the image capturing means of the present invention, the viewpoint conversion unit 31 corresponds to the image conversion means of the present invention, and the alignment unit 32, the first three-dimensional object detection unit 33, 33a, the luminance difference calculation unit 38, and the edge line detection unit 39 correspond to the first three-dimensional object detection means of the present invention. The headlight detection unit 34 corresponds to the light source detection means of the present invention, the second three-dimensional object detection unit 35 corresponds to the second three-dimensional object detection means of the present invention, the three-dimensional object assessment unit 37 corresponds to the control means of the present invention, and the degree-of-clouding calculation unit 36, 36a corresponds to the degree-of-clouding calculation means of the present invention.

The invention claimed is:

1. A three-dimensional object detection device comprising:
   an image capturing unit having a lens for forming captured images of an area rearward of a host vehicle; and
   a computer operatively arranged to receive input of the captured images from the image capturing unit, the computer being programmed to
   perform viewpoint conversion of the captured images captured by the image capturing unit to bird's-eye view images,
   detect a presence of a three-dimensional object based on the captured images captured by the image capturing unit, the presence of the three dimensional object being detected based on differential waveform information that is generated by
      aligning positions of two of the bird's-eye view images obtained at two different times,
      calculating a pixel value difference with respect to each pixel of the aligned bird's-eye view images,
      generating a differential image based on the calculated pixel value differences,
      defining at least one line in the differential image, the at least one line being oriented along a direction in which the three-dimensional object appears collapsed in the bird's-eye view images,
      identifying difference pixels positioned on the at least one line that have a pixel value difference equal to or larger than a predetermined pixel value difference,
      counting a number of the difference pixels identified along each of the at least one line, and
      generating the differential waveform information as a frequency distribution based on the number of the difference pixels counted in each of the at least one line;
   detect a light source which is present behind the host vehicle based on the captured images captured by the image capturing unit,
   detect a presence of a three-dimensional object based on a detection result of detecting the light source,
   calculate a degree to which the lens is clouded as a degree of lens clouding based on the captured images, the degree of lens clouding being calculated based on a number of peaks having a value equal to or greater than a predetermined threshold value among peaks in the differential waveform information generated within a predetermined time interval, the degree of lens clouding indicating a degree to which a foreign matter is adhered to the lens, assess whether the three-dimensional object is an adjacent vehicle present in an adjacent lane adjacent to a lane of travel of the host vehicle based on at least a detection result of detecting the presence of the three-dimensional object based on the light source when the degree of lens clouding is equal to or greater than a predetermined determination value, and assess whether the three-dimensional object is the adjacent vehicle based on at least a detection result of detecting the presence of the three-dimensional object based on the captured images when the degree of lens clouding is less than the determination value.

2. The three-dimensional object detection device according to claim 1, wherein the computer is further programmed to assign a first weight to the detection result of detecting the presence of the three-dimensional object based on the captured images and assign a second weight to the detection result of detecting the presence of the three-dimensional object based on the light source, the first weight being set relatively smaller and the second weight being set relatively larger as the degree of lens clouding becomes higher, and assess whether the three-dimensional object is the adjacent vehicle based on the weighted detection results.

3. The three-dimensional object detection device according to claim 1, wherein the computer is further programmed to initiate calculation of the degree of lens clouding when the light source is detected.

4. The three-dimensional object detection device according to claim 3, wherein the computer is further programmed to set the predetermined time interval using a time that the light source was detected as a reference, and to calculate the degree of lens clouding based on a number of peaks in the differential waveform information having a value equal to or greater than the predetermined threshold value among the peaks in the differential waveform information generated within the predetermined time interval.

5. The three-dimensional object detection device according to claim 3, wherein the computer is further programmed to set an amount of time before the time at which the light source was detected in the predetermined time interval for calculating the degree of lens clouding.

6. The three-dimensional object detection device according to claim 1, wherein the computer is further programmed to calculate a first score based on the number of peaks in the differential waveform information having a value equal to or greater than the predetermined threshold value in the differential waveform information, to calculate a second score based on a total value of the first scores calculated within the predetermined time interval, and to calculate an integrated value of the second score that was calculated as the degree of lens clouding.

7. The three-dimensional object detection device according to claim 6, wherein the computer is further programmed to set an upper limit to at least one of the first and second scores.

8. A three-dimensional object detection device comprising:

an image capturing unit having a lens for forming captured images of an area rearward of a host vehicle; and a computer operatively arranged to receive input of the captured images from the image capturing unit, the computer being programmed to perform viewpoint conversion of the captured images captured by the image capturing unit to obtain bird's-eye view images, detect a presence of a three-dimensional object based on edge information detected from the bird's-eye view images obtained, the edge information including edge lines detected along a direction in which the three-dimensional object appears collapsed in the bird's-eye view images, the edge lines corresponding to perpendicular edges of the three-dimensional object in real space, detect a light source which is present behind the host vehicle based on the captured images captured by the image capturing unit, detect a presence of a three-dimensional object based on a detection result of detecting the light source, calculate a degree to which the lens is clouded as a degree of lens clouding based on a number of the edge lines included in the edge information detected within a predetermined time interval, the degree of lens clouding indicating a degree to which a foreign matter is adhered to the lens, assess whether the three-dimensional object is an adjacent vehicle present in an adjacent lane adjacent to a lane of travel of the host vehicle based on at least a detection result of detecting the presence of the three-dimensional object based on the light source when the degree of lens clouding is equal to or greater than a predetermined determination value, and assess whether the three-dimensional object is the adjacent vehicle based on at least a detection result of detecting the presence of the three-dimensional object based on the captured images when the degree of lens clouding is less than the determination value.

9. The three-dimensional object detection device according to claim 8, wherein the computer is further programmed to assign a first weight to the detection result of detecting the presence of the three-dimensional object based on the captured images and assign a second weight to the the detection result of detecting the presence of the three-dimensional object based on the light source, the first weight being set relatively smaller and the second weight being set relatively larger as the degree of lens clouding becomes higher, and assess whether the three-dimensional object is the adjacent vehicle based on a weighted detection results.

10. The three-dimensional object detection device according to claim 8, wherein the computer is further programmed to initiate calculation of the degree of lens clouding when the light source is detected.

11. The three-dimensional object detection device according to claim 10, wherein the computer is further programmed to set the predetermined time interval using a time that the light source was detected as a reference, and to calculate the degree of lens clouding based on a number of edge lines included in the edge information detected within the predetermined time interval.

12. The three-dimensional object detection device according to claim 10, wherein
the computer is further programmed to set an amount of time before the time at which the light source was detected in the predetermined time interval in calculating the degree of lens clouding.

13. The three-dimensional object detection device according to claim 8, wherein
the computer is further programmed to calculate a first score based on a number of the edge lines included in the edge information, to calculate a second score based on a total value of the first scores calculated within the predetermined time interval, and to calculate an integrated value of the calculated second score as the degree of lens clouding.

14. The three-dimensional object detection device according to claim 13, wherein
the computer is further programmed to set an upper limit to at least one of the first and second scores.

15. A three-dimensional object detection method comprising:
converting viewpoints of captured images of an area rearward of a host vehicle to bird's-eye view images;
generating a differential waveform information by
aligning positions of two of the bird's-eye view images obtained at two different times in bird's-eye view,
calculating a pixel value difference with respect to each pixel of the aligned bird's-eye view images,
generating a differential image based on the calculated pixel value differences,
defining at least one line in the differential image, the at least one line being oriented along a direction in which the three-dimensional object appears collapsed in the bird's-eye view images,
identifying difference pixels positioned on the at least one line that have a pixel value difference equal to or larger than a predetermined pixel value difference,
counting a number of the difference pixels identified along each of the at least one line, and
generating the differential waveform information as a frequency distribution based on the number of the difference pixels counted in each of the at least one line;
detecting a presence of a three-dimensional object based on the differential waveform information and outputting a first detection result;
detecting a light source which is present behind the host vehicle based on the captured images;
detecting a presence of the three-dimensional object based on a detection result of the light source being present behind the host vehicle and outputting a second detection result;
calculating a degree to which a lens is clouded as a degree of lens clouding based on a number of peaks in the differential waveform information having a pixel value equal to or greater than a predetermined threshold value among peaks in the differential waveform information generated within a predetermined time interval, the degree of lens clouding indicating a degree to which a foreign matter is adhered to the lens;
assessing whether the three-dimensional object is an adjacent vehicle existing in an adjacent lane adjacent to a lane of travel of the host vehicle based on at least the second detection result from among the first detection result and the second detection result when the degree of lens clouding is equal to or greater than a predetermined determination value; and
assessing whether the three-dimensional object is the adjacent vehicle based on at least the first detection result from among the first detection result and the second detection result when the degree of lens clouding is less than the determination value.

16. A three-dimensional object detection method comprising:
converting viewpoints of captured images of an area rearward of a host vehicle to bird's-eye view images;
detecting a presence of a three-dimensional object by detecting edge information along a direction in which the three-dimensional object appears collapsed in the bird's-eye view images and outputting a first detection result, the edge information including edge lines corresponding to perpendicular edges of the three-dimensional object in real space;
detecting a light source which is present behind the host vehicle based on the captured image;
detecting a presence of the three-dimensional object based on a detection result of the light source being present behind the host vehicle and outputting a second detection result;
calculating a degree to which a lens is clouded as a degree of lens clouding based on a number of the edge lines included in the edge information detected within a predetermined time interval, the degree of lens clouding indicating a degree to which a foreign matter is adhered to the lens;
assessing whether the three-dimensional object is an adjacent vehicle existing in an adjacent lane adjacent to a lane of travel of the host vehicle based on at least the second detection result from among the first detection result and the second detection result when the degree of lens clouding is equal to or greater than a predetermined determination value; and
assessing whether the three-dimensional object is the adjacent vehicle based on at least the first detection result from among the first detection result and the second detection result when the degree of lens clouding is less than the determination value.

* * * * *